(12) United States Patent
Wang et al.

(10) Patent No.: US 12,411,525 B2
(45) Date of Patent: Sep. 9, 2025

(54) SUPPORT STRUCTURE AND DISPLAY DEVICE

(71) Applicant: BOE Technology Group Co., Ltd., Beijing (CN)

(72) Inventors: Xinyu Wang, Beijing (CN); Yonghong Zhou, Beijing (CN); Shangchieh Chu, Beijing (CN); Linlin Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/921,231

(22) PCT Filed: Oct. 25, 2021

(86) PCT No.: PCT/CN2021/126217
§ 371 (c)(1),
(2) Date: Oct. 25, 2022

(87) PCT Pub. No.: WO2023/070289
PCT Pub. Date: May 4, 2023

(65) Prior Publication Data
US 2024/0219967 A1    Jul. 4, 2024

(51) Int. Cl.
*G06F 1/16* (2006.01)

(52) U.S. Cl.
CPC .......... *G06F 1/1656* (2013.01); *G06F 1/1616* (2013.01); *G06F 1/1624* (2013.01); *G06F 1/1652* (2013.01)

(58) Field of Classification Search
CPC .... G06F 1/1656; G06F 1/1616; G06F 1/1624; G06F 1/1652; G06F 1/1681; F16C 11/04; G09F 9/30
See application file for complete search history.

(56) References Cited

U.S. PATENT DOCUMENTS

| 8,720,011 B1 * | 5/2014 | Hsu ...................... G06F 1/1681 |
| | | 16/354 |
| 9,625,947 B2 * | 4/2017 | Lee ........................ G06F 1/1616 |
| 9,786,207 B2 | 10/2017 | Kim et al. |

(Continued)

FOREIGN PATENT DOCUMENTS

| CN | 205847346 U | 12/2016 |
| CN | 106486018 A | 3/2017 |

(Continued)

*Primary Examiner* — Rockshana D Chowdhury
(74) *Attorney, Agent, or Firm* — XSENSUS LLP

(57) ABSTRACT

Provided is a support structure. The support structure includes: a rotation shaft, two slidable connection mechanisms, at least two chains, and a first support assembly. The two slidable connection mechanisms are rotatably connected to the rotation shaft and disposed on two sides of the rotation shaft; the at least two chains are spaced apart in an axial direction of the rotation shaft, extension directions of the at least two chains are perpendicular to the axial direction of the rotation shaft, middle portions of the at least two chains are connected to the rotation shaft, and two ends of each of the at least two chains are respectively connected to the two slidable connection mechanisms; and in the axial direction of the rotation shaft, each of the at least one first support assembly is connected between two adjacent chains of the at least two chains.

18 Claims, 20 Drawing Sheets

(56) References Cited

U.S. PATENT DOCUMENTS

| | | |
|---|---|---|
| 10,032,391 B2 | 7/2018 | Kim et al. |
| 10,162,389 B2 * | 12/2018 | Tazbaz .................. H04M 1/022 |
| 10,174,534 B2 * | 1/2019 | Tazbaz .................. G06F 1/1616 |
| 10,429,896 B2 * | 10/2019 | Kuramochi ............ G06F 1/1681 |
| 10,627,867 B2 | 4/2020 | Cheng et al. |
| 10,834,814 B2 | 11/2020 | Cho et al. |
| 10,847,735 B2 | 11/2020 | Seo |
| 11,048,305 B1 | 6/2021 | Ye et al. |
| 11,408,214 B1 * | 8/2022 | Hsu ....................... H04M 1/022 |
| 11,503,728 B2 * | 11/2022 | Sun ....................... H05K 5/0226 |
| 11,630,491 B2 * | 4/2023 | Huang .................. G06F 1/1616 |
| | | 361/679.01 |
| 11,644,873 B2 * | 5/2023 | Hsu ....................... G06F 1/1681 |
| | | 361/679.27 |
| 11,720,152 B2 * | 8/2023 | Hsu ....................... G06F 1/1681 |
| | | 16/354 |
| 11,720,153 B2 * | 8/2023 | Hsu ....................... G06F 1/1681 |
| | | 16/250 |
| 11,812,568 B2 * | 11/2023 | Xie ....................... H05K 5/0226 |
| 12,032,417 B2 * | 7/2024 | Park ....................... H04M 1/022 |
| 2014/0245569 A1 * | 9/2014 | Cho ....................... E05D 3/122 |
| | | 16/370 |
| 2017/0061836 A1 | 3/2017 | Kim et al. |
| 2017/0365197 A1 | 12/2017 | Kim et al. |
| 2018/0242446 A1 | 8/2018 | Cho et al. |
| 2019/0179373 A1 | 6/2019 | Cheng et al. |
| 2019/0196541 A1 * | 6/2019 | O'Neil .................. G06F 1/1652 |
| 2020/0212325 A1 | 7/2020 | Seo |
| 2020/0323091 A1 * | 10/2020 | Nagai .................... H04M 1/022 |
| 2020/0409422 A1 * | 12/2020 | Wang .................... F16C 11/045 |
| 2021/0011514 A1 * | 1/2021 | Wang .................... G06F 1/1681 |
| 2021/0011527 A1 | 1/2021 | Alva et al. |
| 2021/0059059 A1 * | 2/2021 | Pai ........................ G06F 1/1681 |
| 2021/0223826 A1 | 7/2021 | Ye et al. |
| 2022/0039277 A1 * | 2/2022 | Shen ...................... G06F 1/1681 |
| 2022/0276675 A1 * | 9/2022 | Hou ....................... G06F 1/1652 |
| 2022/0321683 A1 | 10/2022 | Luo et al. |
| 2023/0031086 A1 * | 2/2023 | Hung .................... H05K 5/0226 |

FOREIGN PATENT DOCUMENTS

| | | |
|---|---|---|
| CN | 207399685 U | 5/2018 |
| CN | 108508967 A | 9/2018 |
| CN | 108738258 A | 11/2018 |
| CN | 109686261 A | 4/2019 |
| CN | 208734715 U | 4/2019 |
| CN | 110445913 A | 11/2019 |
| CN | 209731335 U | 12/2019 |
| CN | 111147630 A | 5/2020 |
| CN | 111383533 A | 7/2020 |
| CN | 111837089 A | 10/2020 |
| CN | 112228445 A | 1/2021 |
| CN | 112696426 A | 4/2021 |

* cited by examiner

SUPPORT STRUCTURE AND DISPLAY DEVICE

CROSS-REFERENCE TO RELATED APPLICATION

This application is a U.S. national stage of international application No. PCT/CN2021/126217, filed on Oct. 25, 2021, the content which is incorporated herein by reference in its entirety.

TECHNICAL FIELD

The present disclosure relates to the field of display, and in particular, relates to a support structure and a display device.

BACKGROUND

A bendable display device is widely used in the field of display, and a user adjusts a size of a screen of the bendable display device by bending the bendable display device as actual requirements. The bendable display device includes a flexible display panel and a support structure, and the support structure is configured to support the flexible display panel.

SUMMARY

Embodiments of the present disclosure provide a support structure and a display device. The technical solutions are as follows.

According to some embodiments of the present disclosure, a support structure is provided. The support structure is configured to support a flexible display panel. The support structure includes: a rotation shaft; two slidable connection mechanisms, wherein the two slidable connection mechanisms are rotatably connected to the rotation shaft, disposed on two sides of the rotation shaft, and configured to support an unbendable display region of the flexible display panel; at least two chains, wherein the at least two chains are spaced apart in an axial direction of the rotation shaft, extension directions of the at least two chains are perpendicular to the axial direction of the rotation shaft, middle portions of the at least two chains are connected to the rotation shaft, and two ends of each of the at least two chains are respectively connected to the two slidable connection mechanisms; and at least one first support assembly, wherein in the axial direction of the rotation shaft, each of the at least one first support assembly is connected between two adjacent chains of the at least two chains, and a surface, distal from the rotation shaft, of the first support assembly and a surface, distal from the rotation shaft, of the chain are configured to support a bendable display region of the flexible display panel.

In some embodiments, the first support assembly includes a plurality of first supports juxtaposed in the extension direction of the chain, wherein any two adjacent first supports of the plurality of first supports are rotatably connected, and a rotation centerline is parallel to the axial direction of the rotation shaft.

In some embodiments, in the any two adjacent first supports of the plurality of first supports, an outer sidewall, facing towards the other first support, of one first support includes a first recess, and the other first support includes a first protrusion disposed in the first recess, wherein the first protrusion is rotatably connected to the first recess.

In some embodiments, the support structure further includes: a first connection pin, wherein a middle portion of the first connection pin is fixedly connected to the chain, and one end of the first connection pin is fixedly connected to an end portion of the first support.

In some embodiments, the support structure further includes: two second support assemblies, wherein in the axial direction of the rotation shaft, each of the at least two chains is disposed between the two second support assemblies, an end of one of the two second support assemblies is connected to a side face of one, proximal to one end of the rotation shaft, of the at least two chains, and an end of the other of the two second support assemblies is connected to a side face of one, proximal to the other end of the rotation shaft, of the at least two chains, wherein the side face of the chain is a face, facing towards an end portion of proximal rotation shaft, of the chain.

In some embodiments, the second support assembly includes two pairs of supports, wherein the two pairs of supports are spaced apart in the extension direction of the chain, each of the two pairs of supports includes two second supports juxtaposed in the extension direction of the chain, and one end portion of each of the two second supports is connected to the side face of the chain; and outer sidewalls of the two second supports include second protrusions, wherein the outer sidewalls of the two second supports including the second protrusions are opposite to each other, and the second protrusions of the two second supports are rotatably connected.

In some embodiments, the two slidable connection mechanisms include: at least two rotation plates respectively disposed on the two sides of the rotation shaft and rotatably connected to the rotation shaft; and at least one pair of shift plates, wherein each of the at least one pair of shift plates includes two spaced-apart shift plates, and different pairs of shift plates are spaced apart in the axial direction of the rotation shaft; wherein any one of the at least two rotation plates is opposite to one shift plate, the shift plate is slidably connected to an opposite rotation plate, and a slide direction of the shift plate is perpendicular to the axial direction of the rotation shaft.

In some embodiments, the support structure further includes: a limit assembly, wherein the limit assembly is disposed between two shift plates of one pair of shift plates, one end of the limit assembly is abutted against a side face of at least one of the at least two rotation plates, and a middle portion of the limit assembly is fixedly connected to the rotation shaft; an end face of the other end of the limit assembly includes a plurality of first limit protrusions, wherein the plurality of first limit protrusions are circumferentially spaced apart, and a first limit recess is formed between two adjacent first limit protrusions; and a side face of the rotation plate abutted against the other end of the limit assembly includes a plurality of second limit protrusions, wherein the plurality of second limit protrusions are circumferentially spaced apart, a second limit recess is formed between two adjacent second limit protrusions, and a centerline of the rotation shaft connected to the rotation plate and a centerline of a circumference of the plurality of second limit protrusions are collinear; wherein the first limit protrusion is disposed in the second limit recess, and the second limit protrusion is disposed in the first limit recess, or the first limit protrusion is abutted against the second limit protrusion.

In some embodiments, the limit assembly includes: a first stopper, wherein the first limit protrusion is disposed on one end face, facing towards the rotation plate, of the first stopper; a second stopper spaced apart from the first stopper in the axial direction of the rotation shaft; an elastic member, wherein one end of the elastic member is connected to the other end face of the first stopper, and the other end of the elastic member is connected to one end face of the second stopper; and a mounting block connected to the other end face of the second stopper and fixedly connected to the rotation shaft.

In some embodiments, the support structure further includes: a wrap assembly extending in the axial direction of the rotation shaft; and a rotation shaft connection block fixedly connected to a middle portion of the wrap assembly and including a first rotation shaft through hole for the rotation shaft passing through; wherein in a third direction, the limit assembly is disposed between the first support assembly and the wrap assembly, the third direction is perpendicular to the axial direction of the rotation shaft and the extension direction of the chain, and the wrap assembly is connected to the limit assembly.

In some embodiments, the wrap assembly includes: a middle wrap plate extending in the axial direction of the rotation shaft, wherein the rotation shaft connection block is connected to a surface of the middle wrap plate; two rotation wrap plates extending in the axial direction of the rotation shaft, wherein in the extension direction of the chain, the two rotation wrap plates are respectively disposed on two sides of the middle wrap plate, and the two rotation wrap plates are rotatably connected to the middle wrap plate respectively; and a fixing protrusion connected to the surface of the middle wrap plate, wherein the rotation shaft connection block and the fixing protrusion are connected to the same surface of the middle wrap plate, and the fixing protrusion includes a first fixing boss; wherein the mounting block includes a fixed recess, and the first fixing boss is disposed in the fixing recess.

In some embodiments, the wrap assembly further includes: four shield blocks, wherein two of the four shield blocks are arranged in the axial direction of the rotation shaft and are respectively connected to two ends of one of the two rotation wrap plates, the other two of the four shield blocks are arranged in the axial direction of the rotation shaft and are respectively connected to two ends of the other of the two rotation wrap plates, and in the axial direction of the rotation shaft, the first support assembly is disposed between the two of the four shield blocks, and is disposed between the other two of the four shield blocks.

In some embodiments, the support structure includes: two rotation shafts; a gear plate, wherein a mounting face of the gear plate is parallel to the third direction, the gear plate is detachably connected to the middle wrap plate, and in the axial direction of the rotation shaft, the gear plate is disposed on end portions, on a same side, of the two rotation shafts, wherein the mounting face of the gear plate is a face, facing away from the chain, of the gear plate; a first transmission gear, wherein the first transmission gear is rotatably connected to the mounting face of the gear plate, and a rotation center of the first transmission gear is parallel to the axial direction of the rotation shaft; a second transmission gear, wherein the second transmission gear is rotatably connected to the mounting face of the gear plate, and the second transmission gear is engaged with the first transmission gear; a first synchronous gear, wherein the first synchronous gear is engaged with the first transmission gear, and the first synchronous gear is sleeved onto one of the two rotation shafts; and a second synchronous gear, wherein the second synchronous gear is engaged with the second transmission gear, and the second synchronous gear is sleeved onto the other of the two rotation shafts.

In some embodiments, the support structure further includes: at least two mounting plates, wherein one of the at least two mounting plates is fixedly connected to an outer wall of the first synchronous gear and is connected to one of the at least two rotation plates, the other of the at least two mounting plates is fixedly connected to an outer wall of the second synchronous gear and is connected to the other of the at least two rotation plates, and two rotation plates connected to the at least two mounting plates are disposed on an end portion, on a same side, of the rotation shaft.

In some embodiments, the support structure further includes: an elevator assembly, wherein one end of the elevator assembly is connected to the middle portion of the chain, the other end of the elevator assembly is connected to the rotation shaft, and the elevator assembly is configured to change a distance between the middle portion of the chain and the rotation shaft.

In some embodiments, the elevator assembly includes: a first connection block, wherein the first connection block includes a second rotation shaft through hole, a middle portion of the rotation shaft is disposed in the second rotation shaft through hole, and the first connection block includes a protrusion through hole; a second connection block, wherein the second connection block includes a connection pin through hole, a part of the second connection block is disposed in the protrusion through hole, another part of the second connection block is disposed outside the protrusion through hole, the second connection block is slidably connected to the first connection block, and a slide direction of the second connection block is perpendicular to the axial direction of the rotation shaft and the extension direction of the chain; a second connection pin, wherein one end of the second connection pin is connected to the middle portion of the chain, and the other end of the second connection pin is connected to the connection pin through hole; and an elastic plate, wherein one end of the elastic plate is connected to the first connection block, and the other end of the elastic plate is connected to the second connection block.

In some embodiments, the chain includes: a first link, wherein one end of the first link is connected to one shift plate of the one pair of shift plates; and a plurality of second links, wherein the plurality of second links are sequentially rotatably connected, second links, on one end, of the plurality of second links are connected to the other end of the first link, and second links, on the other end, of the plurality of second links are connected to the other shift plate of the one pair of shift plates; wherein both the first link and the second link include a first limit face and a second limit face, and the second link further includes a third limit face and a fourth limit face, wherein the first limit face is attached to the third limit face in the case that the support structure is not bent, and the second limit face is attached to the fourth limit face in the case that the support structure is in a maximally bending status.

In some embodiments, the support structure includes: four chains and three first support assemblies, wherein the four chains are spaced apart in the axial direction of the rotation shaft, the three first support assemblies are disposed between two adjacent chains of the four chains, and the three first support assemblies are disposed between different two adjacent chains.

In some embodiments, the two slidable connection mechanisms include: four rotation plates and one pair of shift plates, wherein two of the four rotation plates are disposed on one side end portion of the rotation shaft, and are respectively disposed on the two sides of the rotation shaft; the other two of the four rotation plates are disposed on the other side end portion of the rotation shaft, and are respectively disposed on the two sides of the rotation shaft; and one shift plate of the one pair of shift plates is connected to one end of each of the four chains, and the other shift plate of the one pair of shift plates is connected to the other end of each of the four chains.

According to some embodiments of the present disclosure, a display device is provided in the embodiments of the present disclosure. The display device includes: a flexible display panel and the support structure according to above embodiments, wherein the flexible display panel includes a bendable display region, the support structure is disposed on a back face of the flexible display panel, and the rotation shaft is opposite to the bendable display region.

BRIEF DESCRIPTION OF THE DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

REFERENCE NUMERALS

1—first plane display portion; 2—bendable display portion; 3—second plane display portion; 10—rotation shaft; 20—rotation plate; 201—second limit protrusion; 202—second limit recess; 203—first waist-shaped hole; 204—sector-shaped recess; 2041—circle-shaped hole; 2042— slide hole; 205—second waist-shaped hole; 206—rotation plate protrusion; 2061—rotation plate through hole; 207—gear fixing hole; 30—shift plate; 301—first waist-shaped recess; 302—second waist-shaped recess; 303—third waist-shaped hole; 40—chain; 41—first chain; 42—second chain; 43—third chain; 44—fourth chain; 401—first link; 402—second link; 403—first limit face; 404—second limit face; 405—third limit face; 406—fourth limit face; 407—first through hole; 408—recess; 409—protrusion; 4010—second through hole; 50—first support assembly; 501—first support; 5011—mounting recess; 502—first recess; 503—first protrusion; 60—first connection pin; 70—second support assembly; 701—support; 702—second support; 703—second protrusion; 80—limit assembly; 801—first limit protrusion; 802—first limit recess; 803—first stopper; 804—second stopper; 805—elastic member; 806—mounting block; 807—fixing recess; 8071—first fixing sub-recess; 8072—second fixing sub-recess; 808—mounting through hole; 90—wrap assembly; 901—middle wrap plate; 902—rotation wrap plate; 9011—third limit protrusion; 903—fixing protrusion; 9031—first fixing boss; 9032—second fixing protrusion; 904—shield block; 905—rotation shaft wrap member; 9051—rotation shaft mounting recess; 100—rotation shaft connection block; 1001—first rotation shaft through hole; 110—gear plate; 1101—third limit recess; 120—first transmission gear; 130—second transmission gear; 140—first synchronous gear; 150—second synchronous gear; 160—mounting plate; 1000—rotation sub-shaft; 1601—mounting hole; 1602—second screw; 170—elevator assembly; 1701—first connection block; 1702—second rotation shaft through hole; 1703—second connection block; 1704—connection pin through hole; 1705—second connection pin; 1706—elastic plate; 1707—protrusion through hole; 1708—square through bole; 180—snap ring; 190—slide block; 200—slide plate; 2001—slide way; 2002—fourth waist-shaped bole; 210—rotation rod; 2101—body rod; 2102—first protrusion; 2103—second protrusion; 2104—third protrusion; 220—shield plate; 230—support plate; 240—stud; 250—rear shell; 260—fixing plate.

DETAILED DESCRIPTION

To make the objectives, technical solutions, and advantages of the present disclosure clearer, the embodiments of the present disclosure are further described in detail hereinafter with reference to the accompanying drawings.

Figure 1:
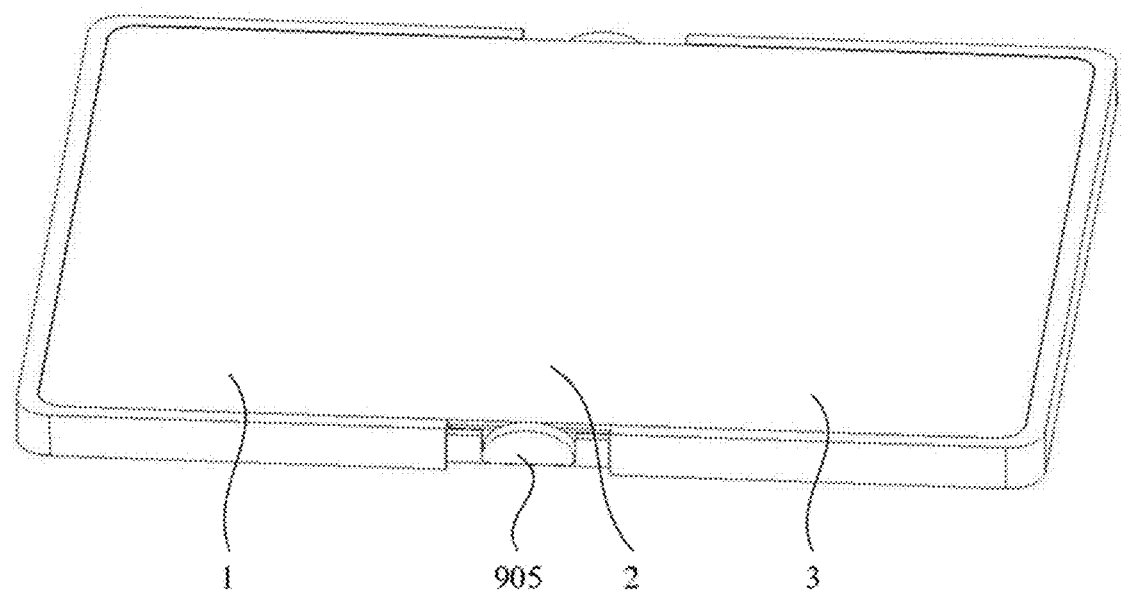
FIG. 1 is a schematic structural diagram of a bendable display device in a not bent status according to some embodiments of the present disclosure.

FIG. 1 is a schematic structural diagram of a bendable display device in a not bent status according to some embodiments of the present disclosure. Referring to FIG. 1, the bendable display device includes a first plane display portion 1, a bendable display portion 2, and a second plane display portion 3 that are sequentially connected. In FIG. 1, the bendable display device is not bent. In this case, a surface of the first plane display portion 1, a surface of the bendable display portion 2, and a surface of the second plane display portion 3 are coplanar.

Figure 2:
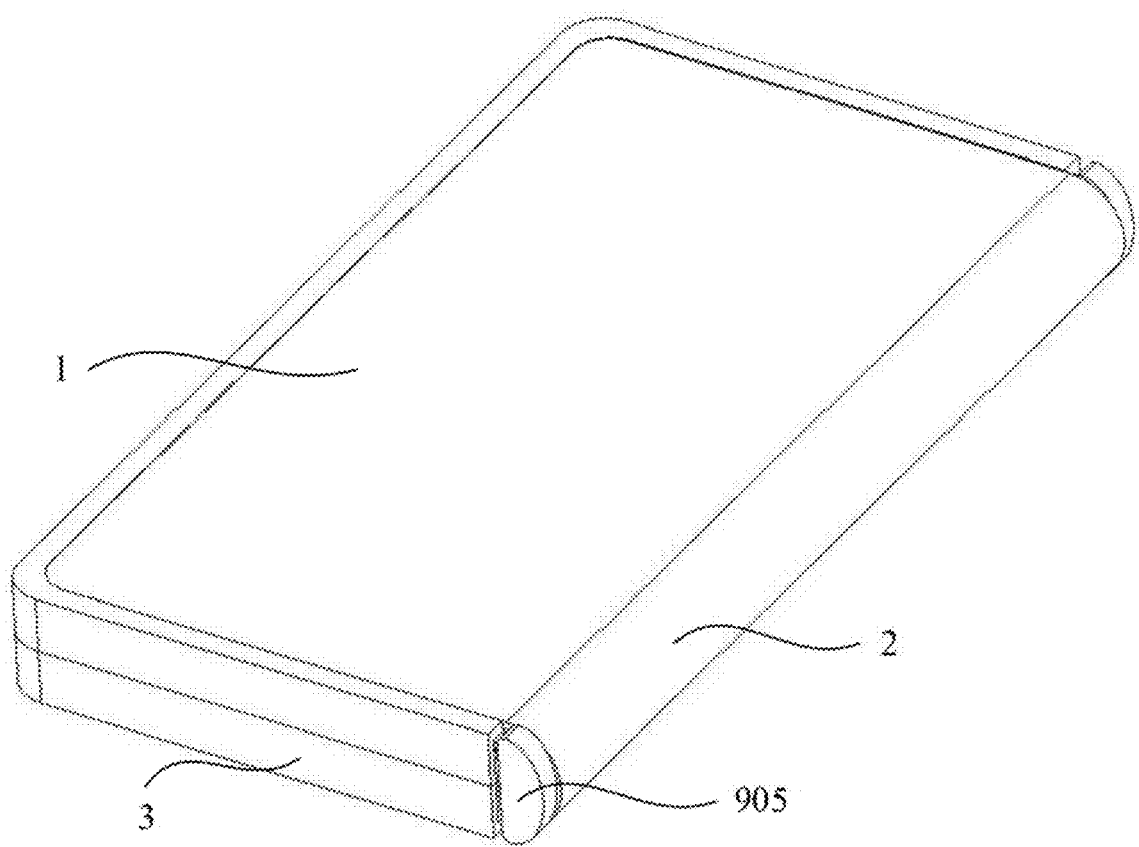
FIG. 2 is a schematic structural diagram of a bendable display device in a bent status according to some embodiments of the present disclosure.

FIG. 2 is a schematic structural diagram of a bendable display device in a bent status according to some embodiments of the present disclosure. Referring to FIG. 2, the bendable display device is bent at the bendable display portion 2, such that a bottom face of the first plane display portion 1 is opposite to a bottom face of the second plane display portion 3. In this case, the bendable display device is bent, such that the bendable display device is portable. The surface of the display portion is a face for displaying, the bottom face of the display portion is opposite to the surface of the display portion.

The bendable display device includes a flexible display panel and a support structure, and the support structure is configured to support the flexible display panel.

In some practices, the support structure includes a rotation shaft, a chain, a support plate, and two slidable connection mechanisms. The rotation shaft and the support plate are configured to support a bendable display region of the flexible display panel. The two slidable connection mechanisms are rotatably connected to the rotation shaft, disposed on two sides of the rotation shaft, and configured to support an unbendable display region of the flexible display panel. A middle portion of the chain is connected to the rotation shaft, and two ends of the chain are respectively connected to the two slidable connection mechanisms.

The rotation shaft, the chain, and the support plate are laminated. In the case that thicknesses of the rotation shaft and the chain are determined, the support plate is designed to be thin enough to reduce a thickness of the support structure. Thus, the support plate is prone to being damaged, and the support structure is further damaged.

Figure 3:
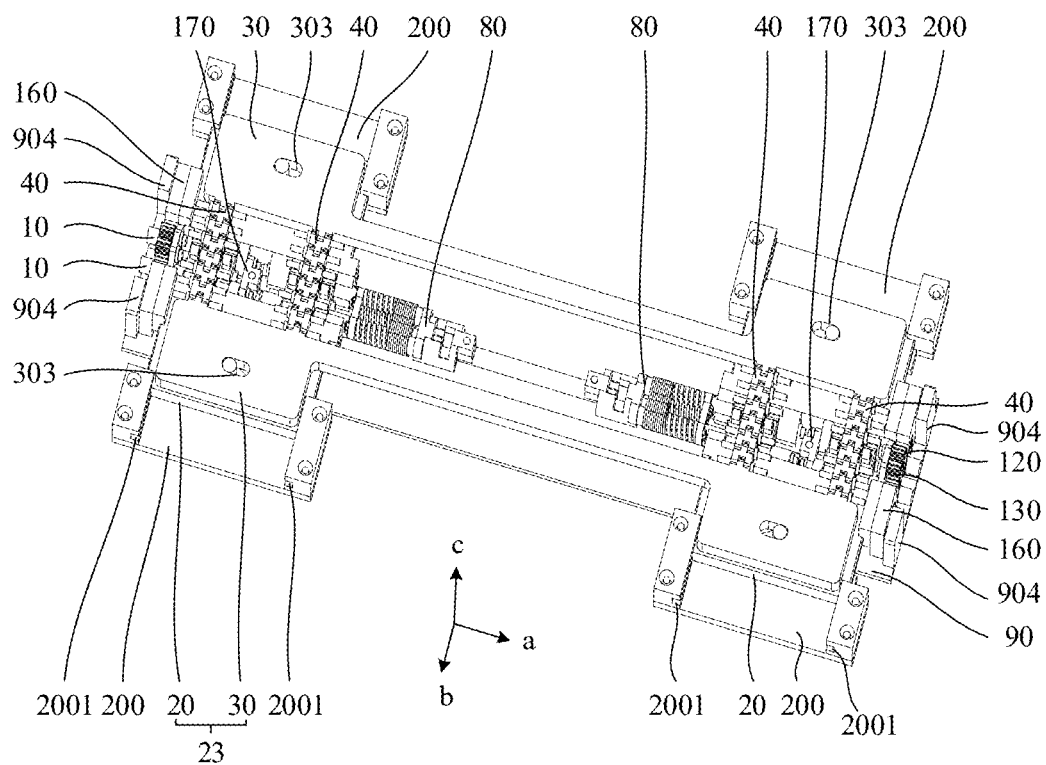
FIG. 3 is a schematic structural diagram of a support structure according to some embodiments of the present disclosure.

FIG. 3 is a schematic structural diagram of a support structure according to some embodiments of the present disclosure. Referring to FIG. 3, the support structure includes a rotation shaft 10, a slidable connection mechanism 23, and at least two chains 40.

The two slidable connection mechanisms 23 are rotatably connected to the rotation shaft 10, disposed on two sides of the rotation shaft 10, and configured to support an unbendable display region of the flexible display panel. The at least two chains 40 are spaced apart in an axial direction of the rotation shaft 10, extension directions of the at least two chains 40 are perpendicular to the axial direction of the rotation shaft 10, middle portions of the at least two chains 40 are connected to the rotation shaft 10, and two ends of each of the at least two chains 40 are respectively connected to the two slidable connection mechanisms 23.

It is noted that, for displaying the rotation shaft, and other structures, FIG. 3 does not show all structures of the support structure.

Figure 4:
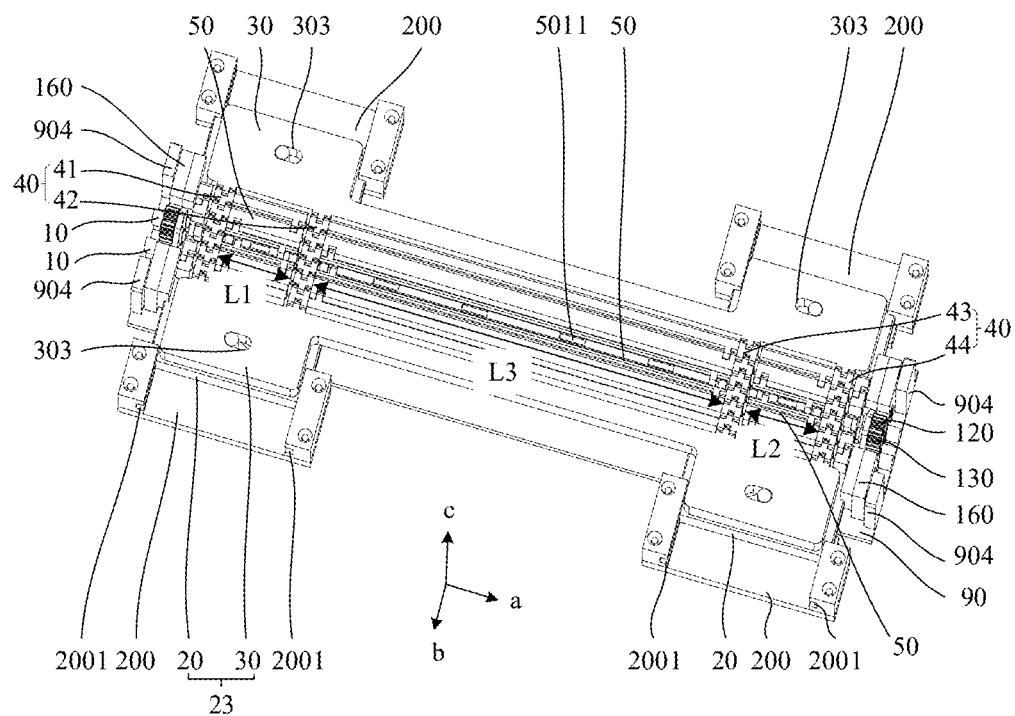
FIG. 4 is a schematic structural diagram of a support structure according to some embodiments of the present disclosure.

FIG. 4 is a schematic structural diagram of a support structure according to some embodiments of the present disclosure. Referring to FIG. 4, in the axial direction of the rotation shaft 10, each of the at least one first support assembly 50 is connected between two adjacent chains 40 of the at least two chains 40, and a surface, distal from the rotation shaft 10, of the first support assembly 50 and a surface, distal from the rotation shaft 10, of the chain 40 are configured to support a bendable display region of the flexible display panel.

In the embodiments of the present disclosure, as the first support assembly 50 is disposed between two adjacent chains 40, the surface of the first support assembly 50 and the surface of the chain 40 form a support face to support the bendable display region of the flexible display panel. In the case that thicknesses of the chain 40 and the rotation shaft 10 are determined, it is not necessary to dispose the support face above the chain 40, such that a thickness of a bendable support device is reduced. As the first support assembly 50 is disposed between two adjacent chains 40, a height for disposing the first support assembly 50 is increased, and a thickness of the first support assembly 50 is increased. Thus, a support strength of the entire support structure is increased, and a possibility of damaging the bendable support device is reduced.

In the embodiments of the present disclosure, the rotation shaft 10 extends in a first direction a, and the first support assembly 50 extends in the first direction a.

Referring to FIG. 3 and FIG. 4, two slidable connection mechanisms 23 include at least two rotation plates 20 and at least one pair of shift plates 30.

In a second direction b, the at least two rotation plates 20 are respectively disposed on two sides of the rotation shaft 10 and rotatably connected to the rotation shaft. The second direction b is perpendicular to the first direction a. Each of the at least one pair of shift plates 30 includes two shift plates 30 spaced apart in the second direction b, and different pairs of shift plates 30 are spaced apart in the first direction a. At least two chains 40 extend in the second direction b, at least two chains 40 are spaced apart in the first direction a, and the middle portions of at least two chains 40 are connected to the rotation shaft 10. Any of the at least two chains 40 is disposed between two shift plates 30 of one pair of shift plates 30, and two ends of the any of the at least two chains 40 are respectively connected to two shift plates 30 of one pair of shift plates 30. Any one of the at least two rotation plates 20 is opposite to one shift plate 30, the shift plate 30 is slidably connected to an opposite rotation plate 20, and a slide direction of the shift plate 30 is perpendicular to the second direction b.

In the embodiments of the present disclosure, a face, distal from the rotation plate 20, of the shift plate 30 receives the flexible display panel to support the flexible display panel, so as to ensure the shape of the flexible display panel. Two ends of the chain 40 are connected to the shift plate 30, and the chain 40 supports the flexible display panel in the case that the shift plate 30 supports the flexible display panel. The first support assembly 50 is disposed between two adjacent chains 40, and thus, the first support assembly 50 supports the flexible display panel.

In the embodiments of the present disclosure, the rotation shaft 10 and the chain 40 are opposite to the bendable display portion 2, and the shift plates 30 on two sides of the rotation shaft 10 are opposite to the first plane display portion 1 and the second plane display portion 3. In the case that the bendable display device needs to be bent, the bendable display device is bent at the first plane display portion 1 and the second plane display portion 3, and the rotation plate 20 rotates about the rotation shaft 10 and the shift plate 30 rotates under the reaction of the squeeze force. As a centerline of rotating the rotation plate 20 is a centerline of the rotation shaft 10, a centerline of rotating the shift plate 30 is a centerline of the chain 40, and the centerlines are not coincident, a slide occurs between the shift plate 30 and the rotation plate 20 in rotating, such that the bendable display device changes from a not bent status to a bent status.

Referring to FIG. 3 and FIG. 4, the support structure includes four chains 40 and three first support assemblies 50, the four chains 40 are spaced apart in the first direction a, the three first support assemblies 50 are disposed between two adjacent chains 40 of the four chains 40, and the three first support assemblies 50 are disposed between different two adjacent chains 40.

In the embodiments of the present disclosure, four chains 40 are disposed, and the shift plate 30 is driven to rotate based on the rotation of the plurality of chains 40, such that the shift plate 30 is prone to rotating. The first support assembly 50 is disposed between any two adjacent chains 40, such that the support face formed by the chain 40 and the first support assembly 50 is complete and larger, and the support property of the support structure is improved.

In some embodiments, another number of chains 40 is disposed, for example, two, three, five, or more, which is not limited in the present disclosure.

Referring to FIG. 4, the four chains 40 include a first chain 41, a second chain 42, a third chain 43, and a fourth chain 44 that are arranged in the first direction a. A distance L1 between the first chain 41 and the second chain 42 is equal to a distance L2 between the third chain 43 and the fourth chain 44, and is less than a distance L3 between the second chain 42 and the third chain 43. That is, a length of the first support assembly 50 between the first chain 41 and the second chain 42 is equal to a length of the first support assembly 50 between the third chain 43 and the fourth chain 44, and is less than a length of the first support assembly 50 between the second chain 42 and the third chain 43. The length of the first support assembly 50 is a length of the first support assembly 50 in the first direction a.

In some embodiments, the distance L1 between the first chain 41 and the second chain 42, the distance L2 between the third chain 43 and the fourth chain 44, and the distance L3 between the second chain 42 and the third chain 43 are equal. In some embodiments, L1, L2, and L3 are not equal.

In the embodiments of the present disclosure, the rotation shaft 10 includes four rotation sub-shafts (not shown in the drawing) arranged in the first direction a, and the first chain 41, the second chain 42, the third chain 43, and the fourth chain 44 are connected to different rotation sub-shafts.

Referring to FIG. 3 and FIG. 4, the support structure includes four rotation plates 20 and one pair of shift plates 30. Two of the four rotation plates 20 are disposed on one side end portion of the rotation shaft 10, and are respectively disposed on two sides of the rotation shaft 10. The other two of the four rotation plates 20 are disposed on the other side end portion of the rotation shaft 10, and are respectively disposed on two sides of the rotation shaft 10. One shift plate 30 of the one pair of shift plates 30 is connected to one end of each of the four chains 40, and the other shift plate 30 of the one pair of shift plates 30 is connected to the other end of each of the four chains 40.

In the embodiments of the present disclosure, one pair of shift plates 30 is disposed. One shift plate 30 includes two slide portions and a middle elongated connection portion, the two slide portions are connected to the connection portion, such that the shift plate 30 on one side of the rotation shaft 10 is entire. As such, a part of the shift plate 30 is disposed between the second chain 42 and the third chain 43, and the part of the shift plate 30 supports the flexible display panel to improve the support property of the support structure. The rotation plate 20 is disposed above the shift plate 30, and thus has less effect on the support property of the support structure. Thus, four rotation plates 20 are disposed, and the rotation plate 20 is not disposed between the second chain 42 and the third chain 43, such that the weight of the entire rotation plate 20 is reduced to facilitate the portability of the support structure.

In some embodiments, other numbers of rotation plates 20 and shift plates 30 are disposed, for example, two rotation plates 20 and four shift plates 30 (in this case, the shift plate 30 on one side of the rotation shaft 10 is not entire) are disposed, which is not limited in the present disclosure.

Figure 5:
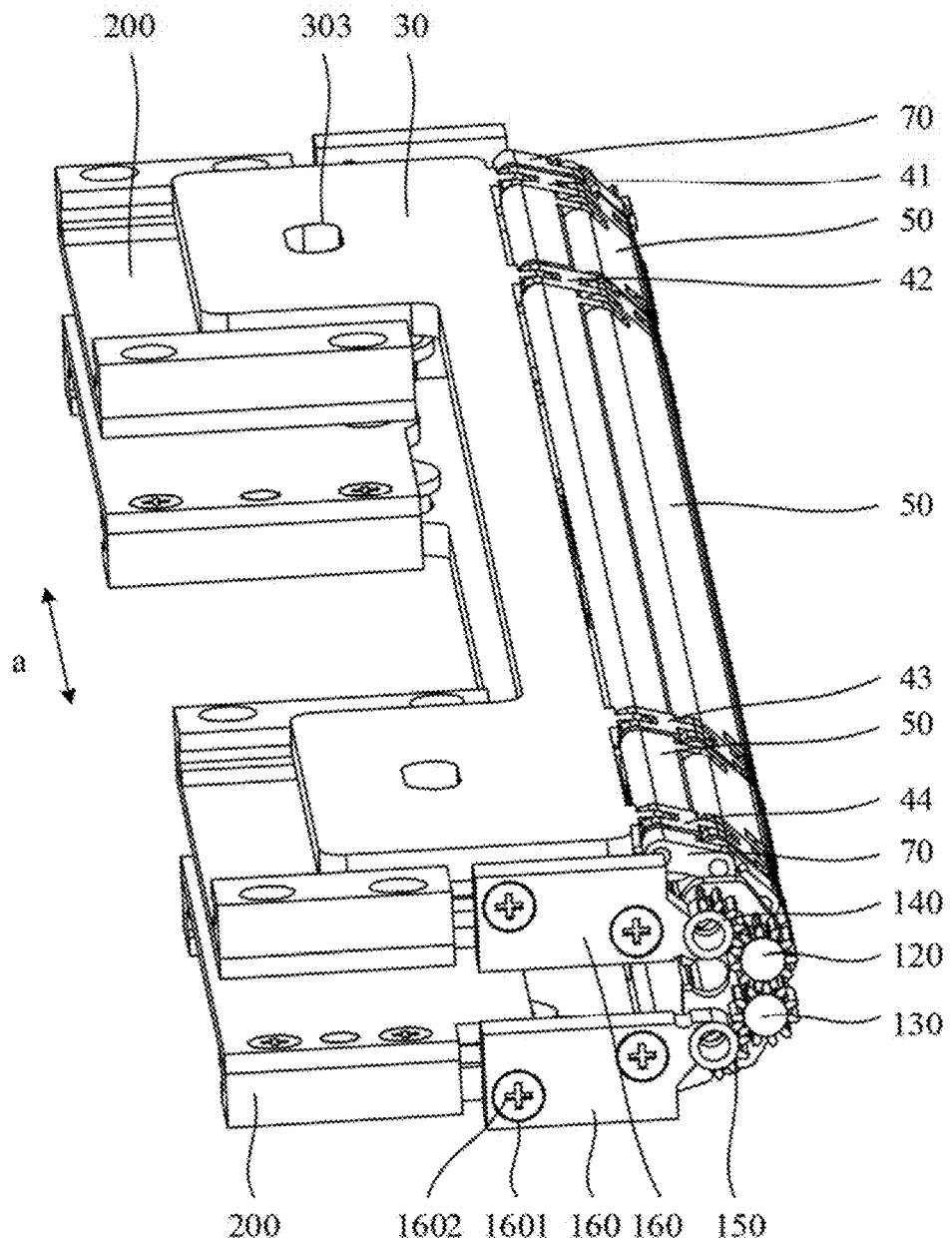
FIG. 5 is a schematic structural diagram of a support structure in a bent status according to some embodiments of the present disclosure.

FIG. 5 is a schematic structural diagram of a support structure in a bent status according to some embodiments of the present disclosure. Referring to FIG. 5, in the case that the support structure is bent, the first support assembly 50 is bent along with the chain (41, 42, 43, and 44) to ensure the bending property of the support structure.

Figure 6:
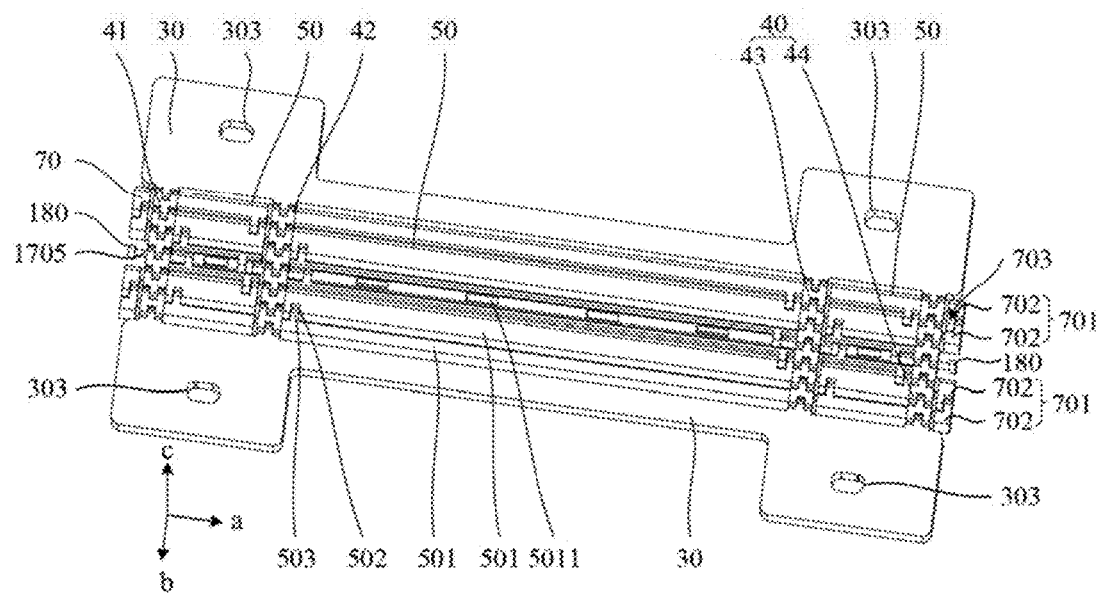
FIG. 6 is a schematic diagram of assembling a first support assembly, a chain, and a shift plate according to some embodiments of the present disclosure.

FIG. 6 is a schematic diagram of assembling a first support assembly, a chain, and a shift plate according to some embodiments of the present disclosure. Referring to FIG. 6, the first support assembly 50 includes a plurality of first supports 501 juxtaposed in the second direction b, any two adjacent first supports 501 of the plurality of first supports 501 are rotatably connected, and a rotation centerline is parallel to the first direction a. In a third direction c, the chain 40 and the first support 501 are disposed on a same side of the rotation shaft 10. The first direction a, the second direction b, and the third direction e are perpendicular to each other.

In the embodiments of the present disclosure, two adjacent first supports 501 are rotated about each other in the case that the first support assembly 50 is to bend, such that the first support assembly 50 is bent.

Figure 7:
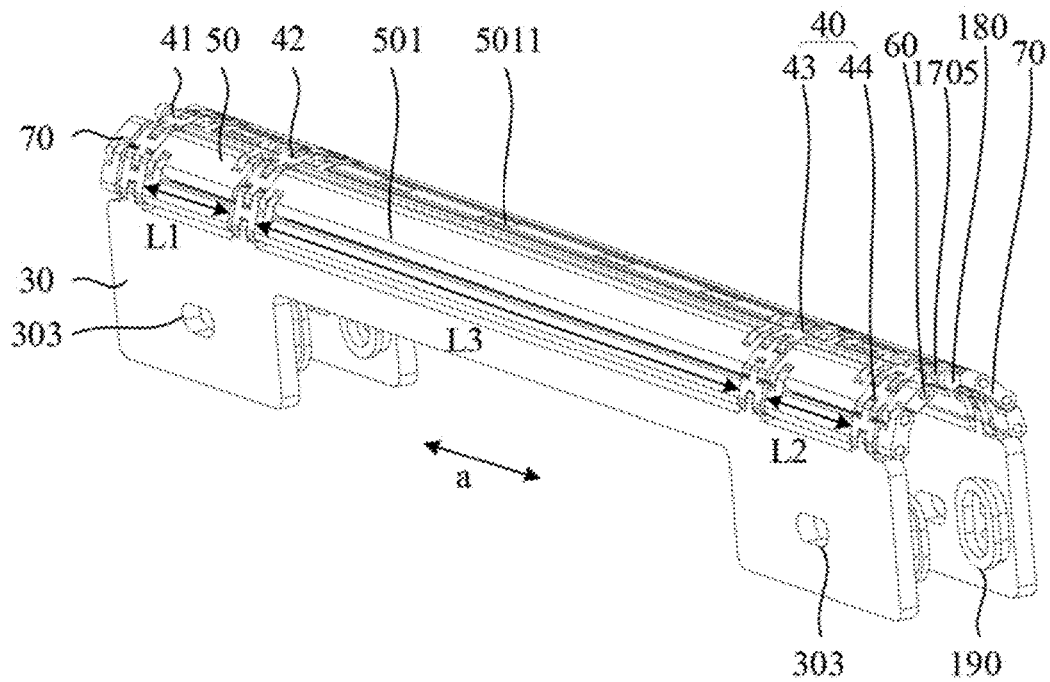
FIG. 7 is schematic structural diagram of the support structure show in FIG. 6 in a bent status.

FIG. 7 is schematic structural diagram of the support structure show in FIG. 6 in a bent status. Referring to FIG. 6 and FIG. 7, the first support assembly 50 includes a plurality of first supports 501.

Referring to FIG. 6, in any two adjacent first supports 501 of the plurality of first supports 501, an outer sidewall, facing towards the other first support 501, of one first support 501 includes a first recess 502, and the other first support 501 includes a first protrusion 503 disposed in the first recess 502, and the first protrusion 503 is rotatably connected to the first recess 502.

In the embodiments of the present disclosure, the first recess 502 is disposed on one of the first support 501, and the first protrusion 503 is disposed on the adjacent first support 501, and the first protrusion 503 is rotatably connected to the first recess 502. As such, the first protrusion 503 is rotated in the first recess 502 in the case that the first support assembly 50 is to bend, such that the first support assembly 50 is bent.

Figure 8:
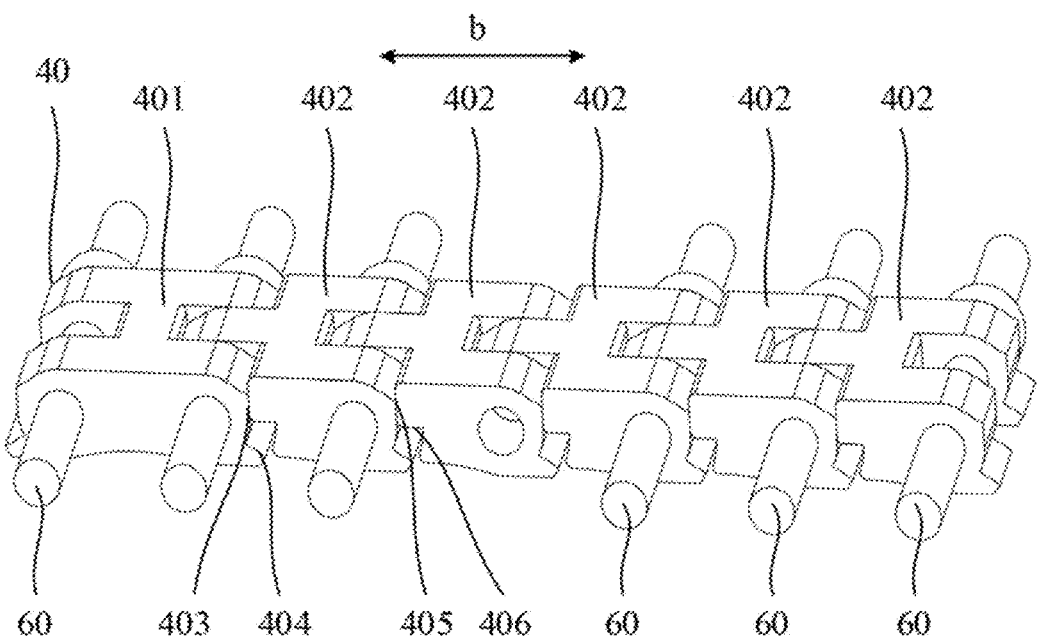
FIG. 8 is a schematic structural diagram of a chain according to some embodiments of the present disclosure.

FIG. 8 is a schematic structural diagram of a chain according to some embodiments of the present disclosure. Referring to FIG. 8, the support structure further includes a first connection pin 60. A middle portion of the first connection pin 60 is fixedly connected to the chain 40, and one end of the first connection pin 60 is fixedly connected to an end portion of the first support 501. Part of the first support 501 is not shown in FIG. 7 for clearer description of the first connection pin 60.

In the embodiments of the present disclosure, the middle portion of the first connection pin 60 is connected to the chain 40, and two ends of the first connection pin 60 are respectively connected to the end portions of two first supports 501, such that the chain 40 and the first support 501 are connected, and the first support 501 is driven to rotate based on the rotation of the chain 40.

In the embodiments of the present disclosure, the end portion of the first support 501 is in a tubular structure. The first connection pin 60 is inserted into the cavity of the tubular structure, and thus the first connection pin 60 and the tubular structure are in interference fit, such that the first support 501 and the first connection pin 60 are connected without other portions, and the structure is simple.

Referring to FIG. 7, mounting recesses 5011 are disposed in the middle portions in the middle of the first supports 501 of the plurality of first supports 501. The flexible display panel includes mounting protrusions corresponding to the mounting recesses 5011, such that the mounting protrusions are disposed in the mounting recesses 5011 to align in the case that the support structure and the flexible display panel are mounted.

In some embodiments, the mounting recess 5011 is a rectangular mounting recess.

In some embodiments, the mounting protrusion is a steel strip, for example, a stainless steel (SUS) structure in the panel.

Referring to FIG. 7, the support structure further includes two second support assemblies 70. In the first direction a, each of the at least two chains 40 is disposed between the two second support assemblies 70, a side face of one of the two second support assemblies 70 is connected to a side face of one, proximal to one end of the rotation shaft 10, of the at least two chains 40, and an end of the other of the two second support assemblies 70 is connected to a side face of one, proximal to the other end of the rotation shaft 10, of the at least two chains 40. The side face of the chain 40 is a face, facing towards an end portion of proximal rotation shaft 10, of the chain 40.

In the embodiments of the present disclosure, the second support assembly 70 is disposed on the end portion. Thus, the second support assembly 70 forms the support face to support the flexible display panel, and the support property of the support structure is improved.

Referring to FIG. 6, the second support assembly 70 includes two pairs of supports 701. The two pairs of supports 701 are spaced apart in the second direction b, each of the two pairs of supports 701 includes two second supports 702 juxtaposed in the second direction b, and one end portion of each of the two second supports 702 is connected to the side face of the chain 40. Outer sidewalls of the two second supports 702 include second protrusions 703. The outer sidewalls of the two second supports 702 including the second protrusions 703 are opposite to each other, and the second protrusions 703 of the two second supports 702 are rotatably connected.

In the embodiments of the present disclosure, two second supports 702 in one pair of supports 701 are rotatably connected by the second protrusion 703, and thus, the second support 702 is driven to rotate based on the rotation of the chain 40, such that the support structure is bent.

Referring to FIG. 6, two ends of the first connection pin 60 connected to the fourth chain 44 are respectively connected to the first support assembly 50 and the second support 702. That is, the fourth chain 44 is connected to the first support assembly 50 and the second support 702 by the first connection pin 60.

Likewise, the first chain 41 is connected to the first support assembly 50 and the second support 702 by the first connection pin 60.

In some embodiments, both the second support 702 and the second protrusion 703 include through holes (not shown in the drawing). Thus, the first connection pin 60 and the through hole are in interference fit, such that the first connection pin 60 and the second support 702 are connected.

As shown in FIG. 6 and FIG. 7, the support structure further includes a second connection pin 1705, and the second connection pin 1705 is connected to the middle portion of the chain 40 (for example, the fourth chain 44). A snap ring 180 is disposed on the end portion of the second connection pin 1705, so as to prevent the second connection pin 1705 from sliding out of the chain 40.

Referring to FIG. 8, the chain 40 includes: a first link 401 and a plurality of second links 402. One end of the first link 401 is connected to one shift plate 30 of the one pair of shift plates 30. The plurality of second links 402 are sequentially connected, second links 402, on one end, of the plurality of second links 402 are connected to the other end of the first link 401, and second links 402, on the other end, of the plurality of second links 402 are connected to the other shift plate 30 of the one pair of shift plates 30.

In the embodiments of the present disclosure, the chain 40 is divided into a plurality of links to facilitate the rotation of the chain 40.

As shown in FIG. 8, one end of the first link 401 is connected to the middle portion of the first connection pin 60. Referring to FIG. 8 and FIG. 7, one end of the first link 401 is connected to the shift plate 30 by the first connection pin 60. The first link 401 is connected to the second link 402 by the first connection pin 60, middle second links 402 are connected to adjacent second links 402 by the second connection pins 1705 (not shown in FIG. 8), and other second links 402 are connected by the first connection pin 60. In conjunction with FIG. 8 and FIG. 7, the second links 402 on the second end are connected to the shift plate 30 by the first connection pin 60. That is, the first connection pins 60 connect to the chain 40, the shift plate 30, and the first support 501.

As shown in FIG. 8, one chain 40 includes one first link 401 and five second links 402, that is, one chain 40 includes six links. One chain 40 is connected to six first connection pins 60. As the chain 40 is connected to the first support assembly 50 by the first connection pin 60, the first support assembly 50 also includes six first supports 501.

In some embodiments, one chain 40 includes other number of links. Likewise, numbers of the first connection pins 60 and the first support assemblies 50 are adjusted.

Figure 9:
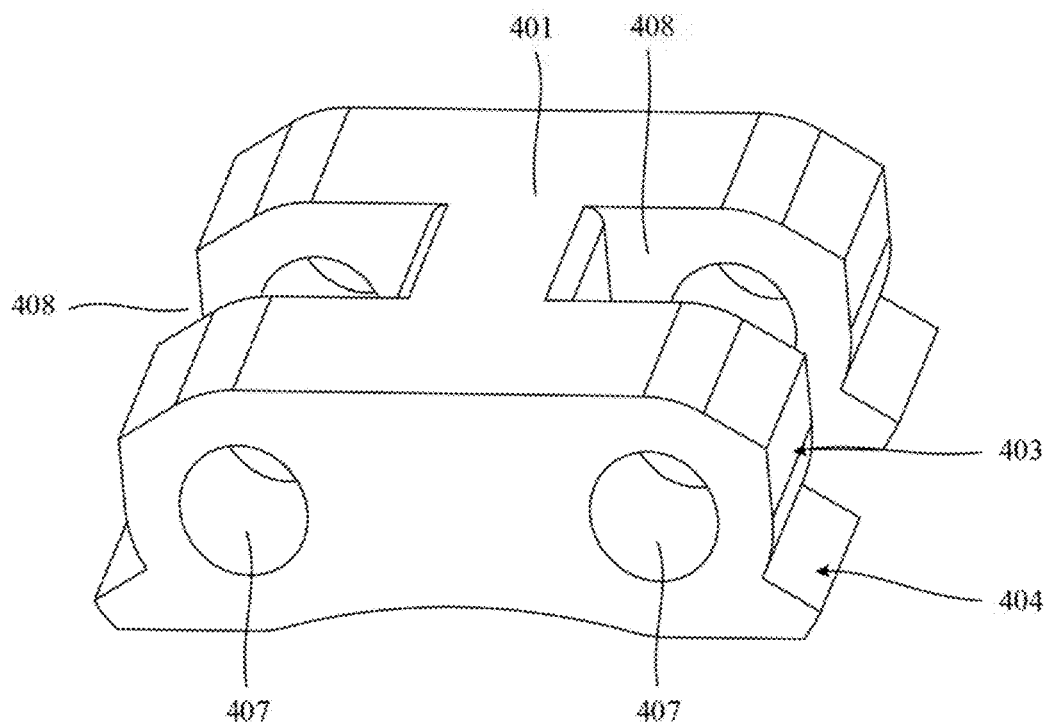
FIG. 9 is a schematic structural diagram of a first link according to some embodiments of the present disclosure.

FIG. 9 is a schematic structural diagram of a first link according to some embodiments of the present disclosure. Referring to FIG. 9, the first link 401 is in an I-shape. One end of the I-shaped first link 401 includes two first through holes 407, and the first connection pin 60 passes through the first through hole 407 to connect the first link 401 to the shift plate 30 and the first support 501. The other end of the I-shaped first link 401 also includes two first through holes 407.

Figure 10:
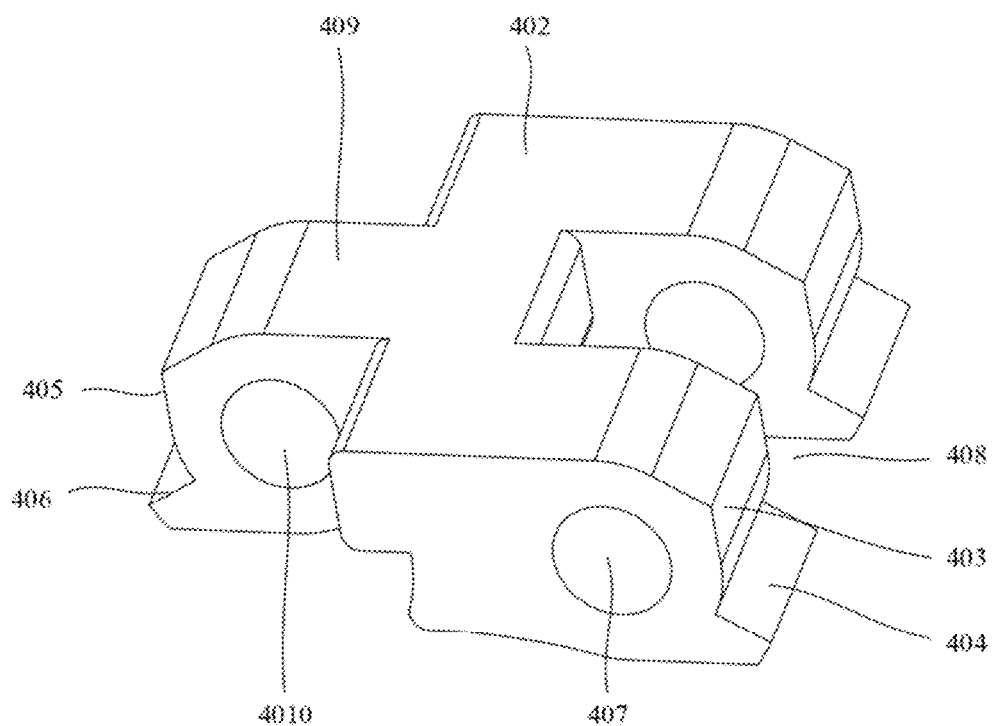
FIG. 10 is a schematic structural diagram of a second link according to some embodiments of the present disclosure.

FIG. 10 is a schematic structural diagram of a second link according to some embodiments of the present disclosure. Referring to FIG. 10, one end of the second link includes a protrusion 409 matching with a recess 408 on the other end of the I-shaped first link 401. The protrusion 409 is disposed in the recess 408, and the protrusion 409 also includes a second through hole 4010. The first support 501 is connected to the first link 401 and the second link 402 by sequentially passing through one first through hole 407 on the first link 401, the second through hole 4010 on the second link 402, and the other first through hole 407 on the first link 401.

Referring to FIG. 8 and FIG. 9, the first link 401 includes a first limit face 403 and a second limit face 404. Referring to FIG. 8 and FIG. 10, the second link 402 also includes the first limit face 403 and the second limit face 404, and the second link 402 further includes a third limit face 405 and a fourth limit face 406.

Referring to FIG. 8, in the case that the chain 40 is not bent, the first limit face 403 is attached to the third limit face 405, such that a flatness of the surface of the chain 40 is ensured.

Figure 11:
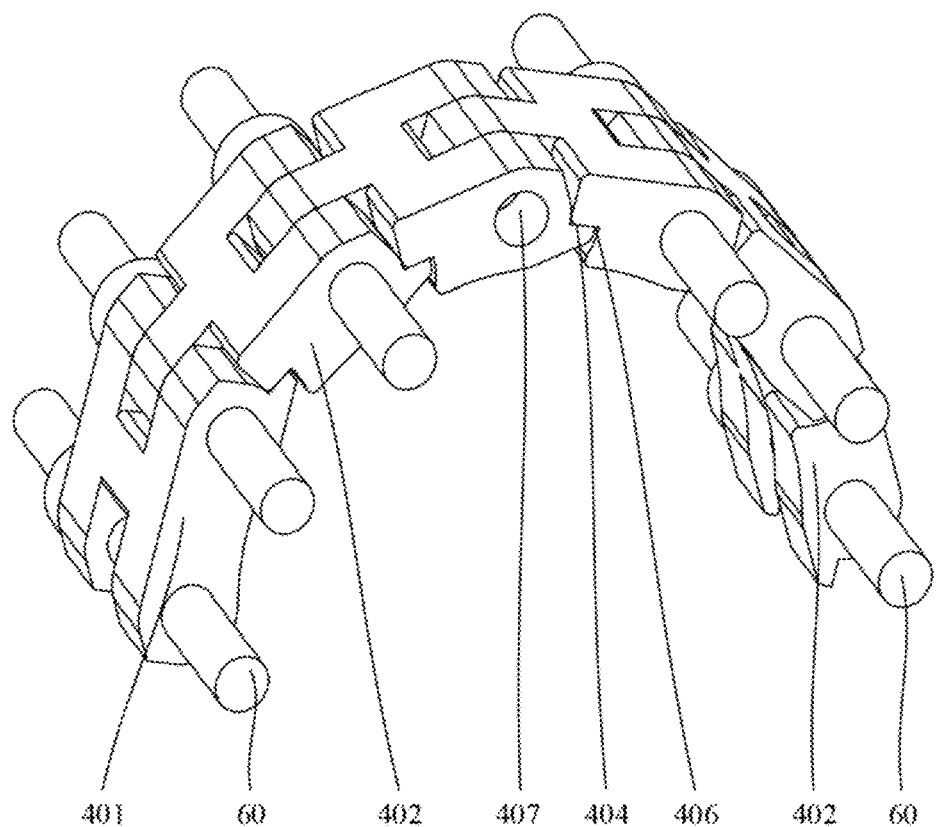
FIG. 11 is a schematic structural diagram of a bent chain according to some embodiments of the present disclosure.

FIG. 11 is a schematic structural diagram of a bent chain according to some embodiments of the present disclosure. Referring to FIG. 11, in the case that the chain 40 is in a maximally bending status, the second limit face 404 is attached to the fourth limit face 406. In this case, the chain is not bent anymore, so as to avoid over-bending or reversely bending the chain.

Figure 12:
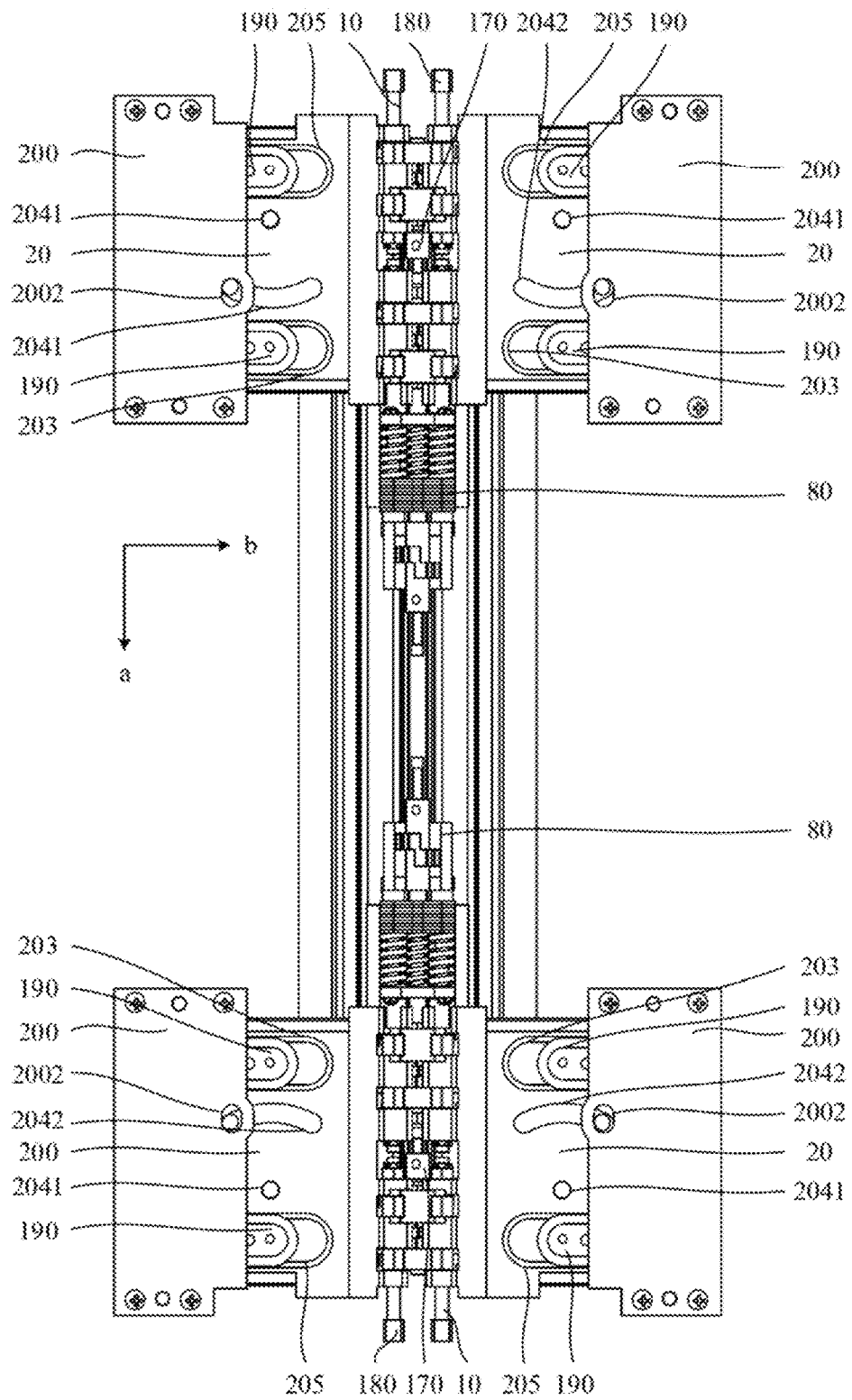
FIG. 12 is a bottom view of a support structure according to some embodiments of the present disclosure.

FIG. 12 is a bottom view of a support structure according to some embodiments of the present disclosure. Referring to FIG. 12, the support structure includes two rotation shafts 10 juxtaposed in the second direction b. Two rotation plates 20 on two sides of the two rotation shafts 10 are respectively connected to the two rotation shafts.

Referring to FIG. 12, the bendable support structure further includes an elevator assembly 170. Referring to FIG. 4, one end of the elevator assembly 170 is connected to the middle portion of the chain 40, the other end of the elevator assembly 170 is connected to the rotation shaft 10, and the elevator assembly 170 is configured to change a distance between the middle portion of the chain 40 and the rotation shaft 10.

In the embodiments of the present disclosure, the elevator assembly 170 is configured to connect the rotation shaft 10 and the chain 40, so as to ensure the stability of the chain 40. One end of the elevator assembly 170 is connected to the middle portion of the chain 40, such that the chain 40 is bent in the middle portion. The elevator assembly 170 is configured to change a distance between the middle portion of the chain 40 and the rotation shaft 10, such that the effort is saved in bending.

Figure 13:
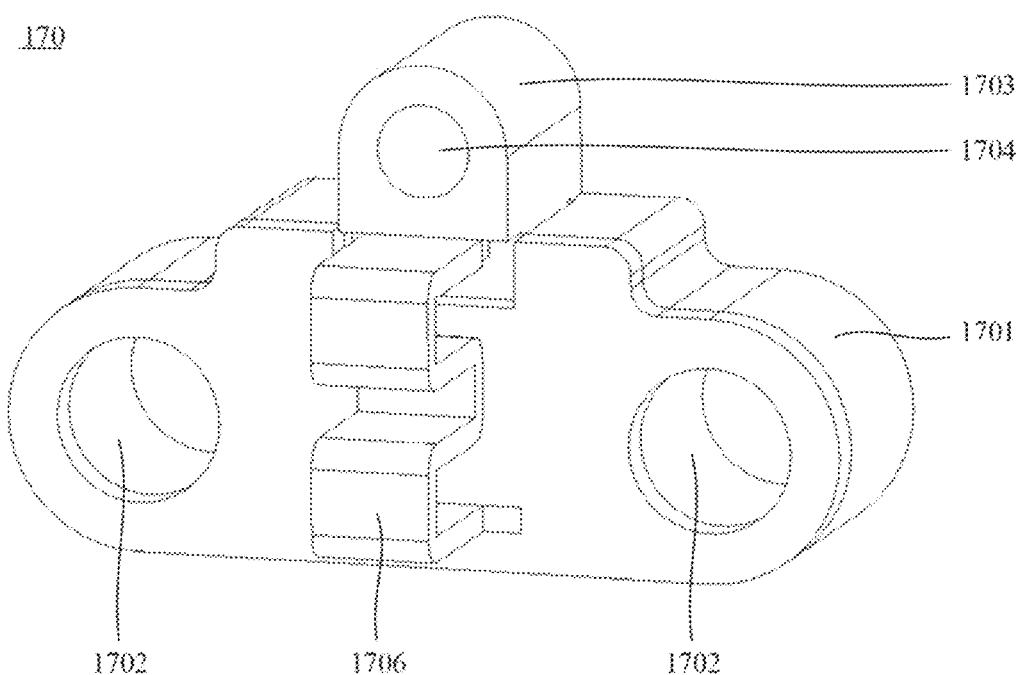
FIG. 13 is a schematic structural diagram of an elevator assembly according to some embodiments of the present disclosure.

FIG. 13 is a schematic structural diagram of an elevator assembly according to some embodiments of the present disclosure. Referring to FIG. 13, the elevator assembly 170 includes: a first connection block 1701, a second connection block 1703, and an elastic plate 1706. The second connection block 1703 is slidably connected to the first connection block 1701, the first connection block 1701 includes a second rotation shaft through hole 1702, and a middle portion of the rotation shaft 10 is disposed in the second rotation shaft through hole 1702. The second connection block 1703 includes a connection pin through hole 1704. One end of the elastic plate 1706 is connected to the first connection block 1701, and the other end of the elastic plate 1706 is connected to the second connection block 1703. In conjunction with FIG. 4, one end of the second connection pin 1705 is connected to the middle portion of the chain 40, and the other end of the second connection pin 1705 is connected to the connection pin through hole 1704.

In the embodiments of the present disclosure, the second connection block 1703 is slidably connected to the first connection block 1701, such that the elastic plate 1706 is elastic. The second connection block 1703 is controlled to slide in the first connection block 1701 based on the elastic force of the elastic plate 1706, and a distance between the second rotation shaft through hole 1702 and the connection pin through hole 1704 is changed, such that the distance between the middle portion of the chain 40 and the rotation shaft 10 is changed.

Figure 14:
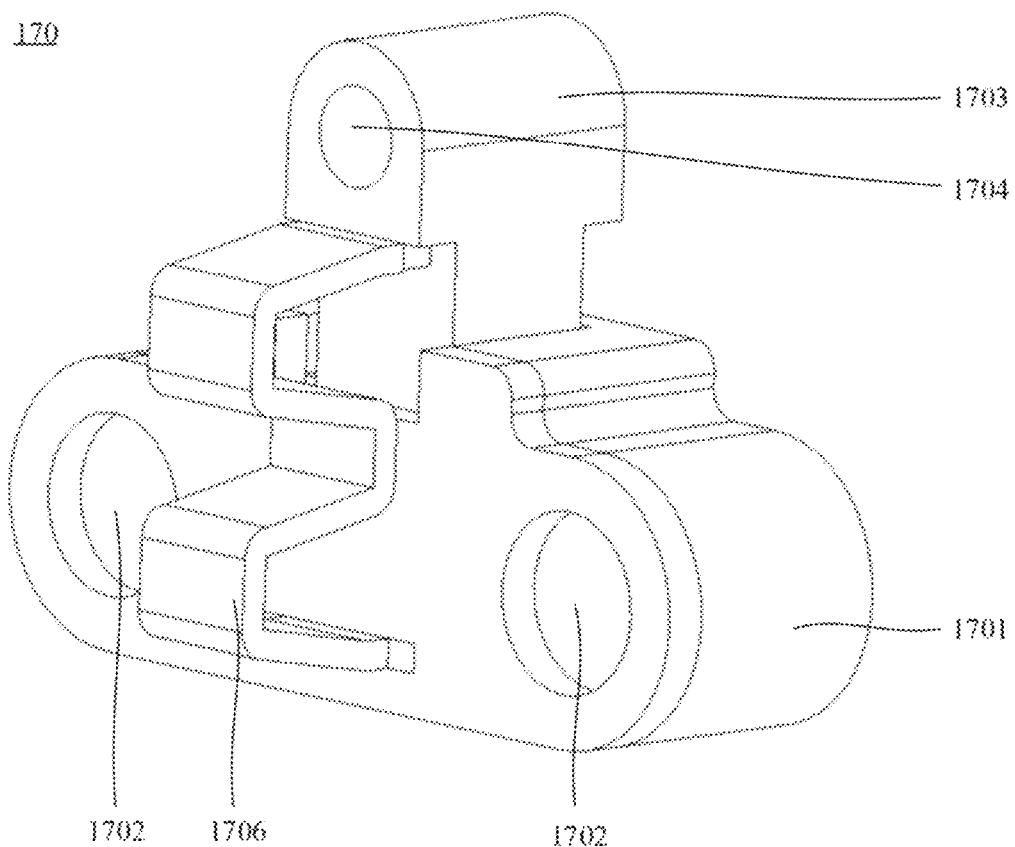
FIG. 14 is a schematic structural diagram of an elevator assembly in another status according to some embodiments of the present disclosure.

In the elevator assembly shown in FIG. 13, the elastic plate 1706 is in a compressed status. FIG. 14 is a schematic structural diagram of an elevator assembly in another status according to some embodiments of the present disclosure. In rotating the support structure, the distance between the middle portion of the chain 40 and the rotation shaft 10 is changed, and the elevator assembly 170 is configured to change the distance between the middle portion of the chain 40 and the rotation shaft 10. In the case that the support structure is in a planar status, the distance between the middle portion of the chain 40 and the rotation shaft 10 is reduced. In this case, the elastic plate 1706 is compressed, and a distance between the second connection block 1703 and the first connection block 1701 is reduced, such that the distance between the middle portion of the chain 40 and the rotation shaft 10 is reduced. In the case that the support structure is bent, the distance between the middle portion of the chain 40 and the rotation shaft 10 is increased. In this case, the elastic force of the elastic plate 1706 increases the distance between the second connection block 1703 and the first connection block 1701, such that the distance between the middle portion of the chain 40 and the rotation shaft 10 is increased.

In some embodiments, the first connection block 1701 and the second connection block 1703 are in a block structure, and the elastic plate 1706 is in a "W" structure.

In some embodiments, the elastic plate 1706 is composed of sheet structures on two ends and a middle elastic connection portion. The sheet structures on two ends are configured to connect and limit, and the middle elastic connection portion is configured to provide the elastic force.

In some embodiments, the elevator assembly does not include the elastic plate, and the elevator function of the elevator assembly is achieved by the assembling relationship of the first connection block and the second connection block.

Figure 15:
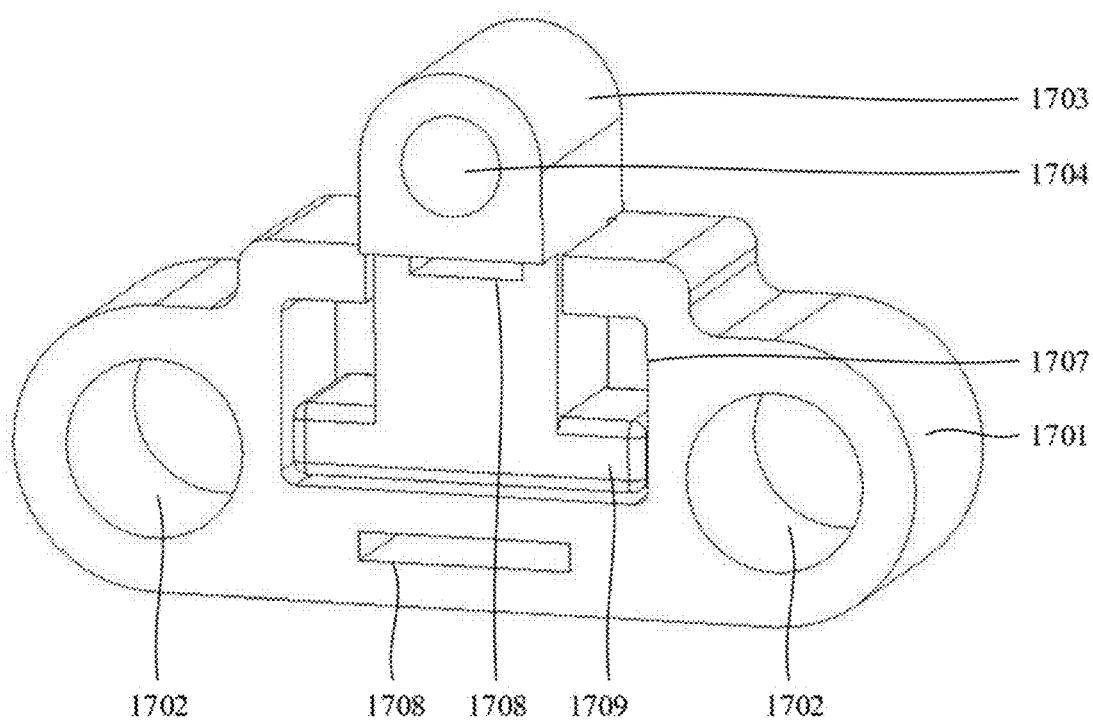
FIG. 15 is a schematic diagram of assembling a first connection block and a second connection block according to some embodiments of the present disclosure.

FIG. 15 is a schematic diagram of assembling a first connection block and a second connection block according to some embodiments of the present disclosure. Referring to FIG. 15, the first connection block 1701 includes a protrusion through hole 1707 for disposing the second connection block 1703, one end of the second connection block 1703 is disposed in the protrusion through hole 1707, and the other end of the second connection block 1703 is disposed outside the protrusion through hole 1707. The other end of the second connection block 1703 includes a limit protrusion 1709 configured to prevent the other end of the second connection block 1703 from escaping from the protrusion through bole 1707. Both the first connection block 1701 and the second connection block 1703 include square through holes 1708. Referring to FIG. 13 and FIG. 14, two end of the elastic plate 1706 are respectively disposed in two square through holes 1708.

Figure 16:
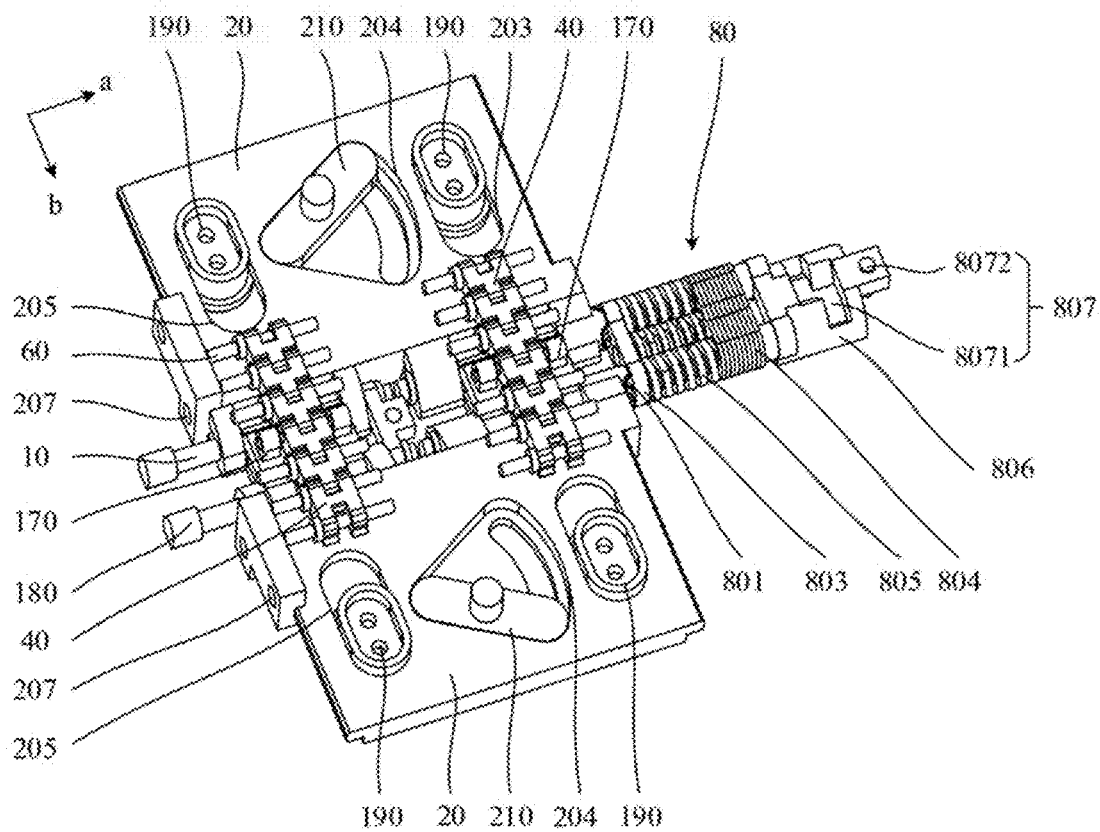
FIG. 16 is a locally schematic diagram of a support structure according to some embodiments of the present disclosure.

FIG. 16 is a locally schematic diagram of a support structure according to some embodiments of the present disclosure. Referring to FIG. 16, the support structure further includes a limit assembly 80.

Figure 17:
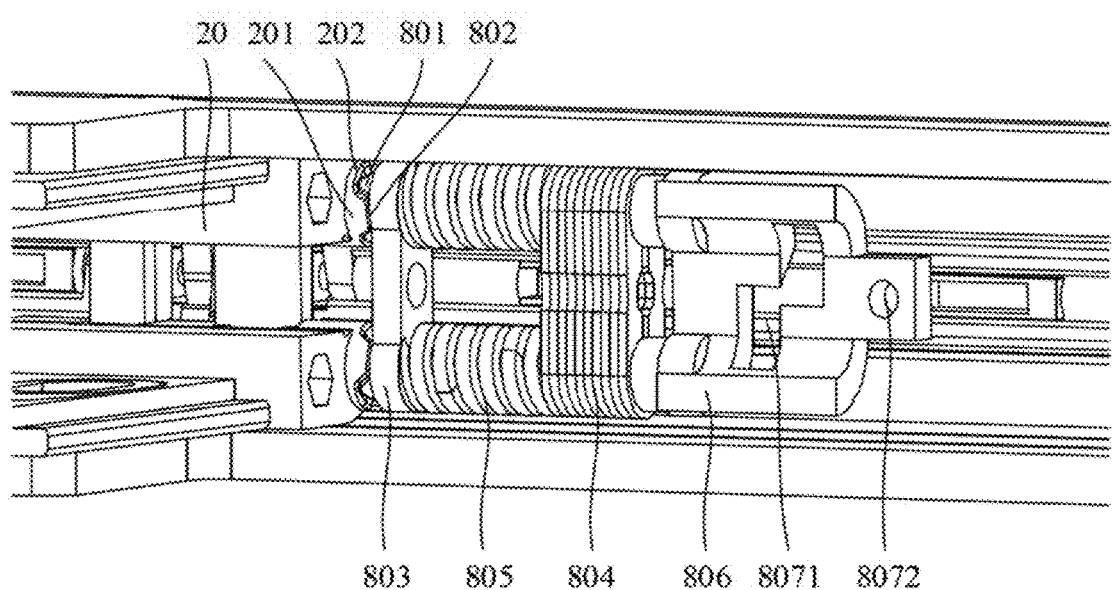
FIG. 17 is a locally schematic diagram of a support structure according to some embodiments of the present disclosure.

FIG. 17 is a locally schematic diagram of a support structure according to some embodiments of the present disclosure. Referring to FIG. 17, one end of the limit assembly 80 is abutted against a side face of at least one of the at least two rotation plates 20, and a middle portion of the limit assembly 80 is fixedly connected to the rotation shaft 10. An end face of the other end of the limit assembly 80 includes a plurality of first limit protrusions 801, the plurality of first limit protrusions 801 are circumferentially spaced apart, and a first limit recess 802 is formed between two adjacent first limit protrusions 801. A side face of the rotation plate 20 abutted against the other end of the limit assembly 80 includes a plurality of second limit protrusions 201. The plurality of second limit protrusions 201 are circumferentially spaced apart, a second limit recess 202 is formed between two adjacent second limit protrusions 201, and a centerline of the rotation shaft 10 connected to the rotation plate 20 and a centerline of a circumference of the plurality of second limit protrusions 201 are collinear. The first limit protrusion 801 is disposed in the second limit recess 202, and the second limit protrusion 201 is disposed in the first limit recess 802, or the first limit protrusion 801 is abutted against the second limit protrusion 201. The limit assembly 80 is disposed between two shift plates 30 of one pair of shift plates 30.

Referring to FIG. 17, the limit assembly 80 includes: a first stopper 803, a second stopper 804, an elastic member 805, and a mounting block 806. The first limit protrusion 801 is disposed on one end face, facing towards the rotation plate 20, of the first stopper 803. The second stopper 804 is spaced apart from the first stopper 803 in the axial direction of the rotation shaft 10. One end of the elastic member 805 is connected to the other end face of the first stopper 803, and the other end of the elastic member 805 is connected to one end face of the second stopper 804. The mounting block 806 is connected to the other end face of the second stopper 804 and fixedly connected to the rotation shaft 10).

Figure 18:
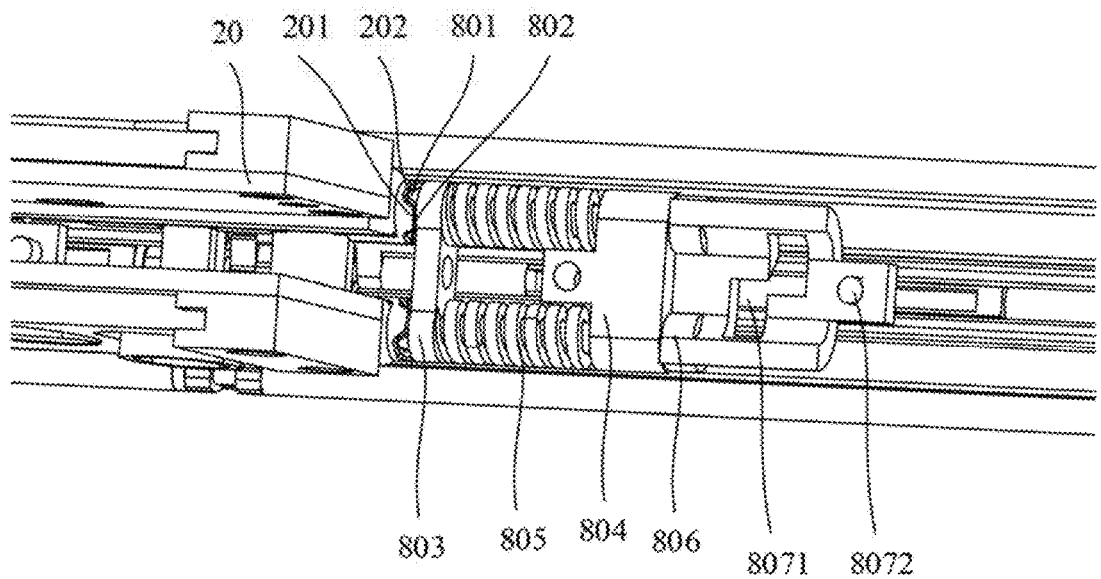
FIG. 18 is a locally schematic diagram of a support structure according to some embodiments of the present disclosure.

FIG. 18 is a locally schematic diagram of a support structure according to some embodiments of the present disclosure. FIG. 18 and FIG. 17 are differed in the shape of the second stopper 804. In FIG. 17, the second stopper 804 is in a pillar-shaped structure laminated by a plurality of rounded rectangle sheets. In FIG. 18, the second stopper 804 is in a T-shaped structure.

Hereinafter is illustrated by taking the support structure in FIG. 18 as an example. A limit assembly 80 is added in the support structure. In the case that the support structure is in different bending status, the limit assembly 80 is configured to limit, such that the support structure keeps in a specific status, for example, a complete open status, a complete close status, a semi-open status, and the like.

In FIG. 18, the support structure is in a complete close status. In this case, the first limit protrusion 801 is disposed in the second limit recess 202, and the second limit protrusion 201 is disposed in the first limit recess 802.

Figure 19:
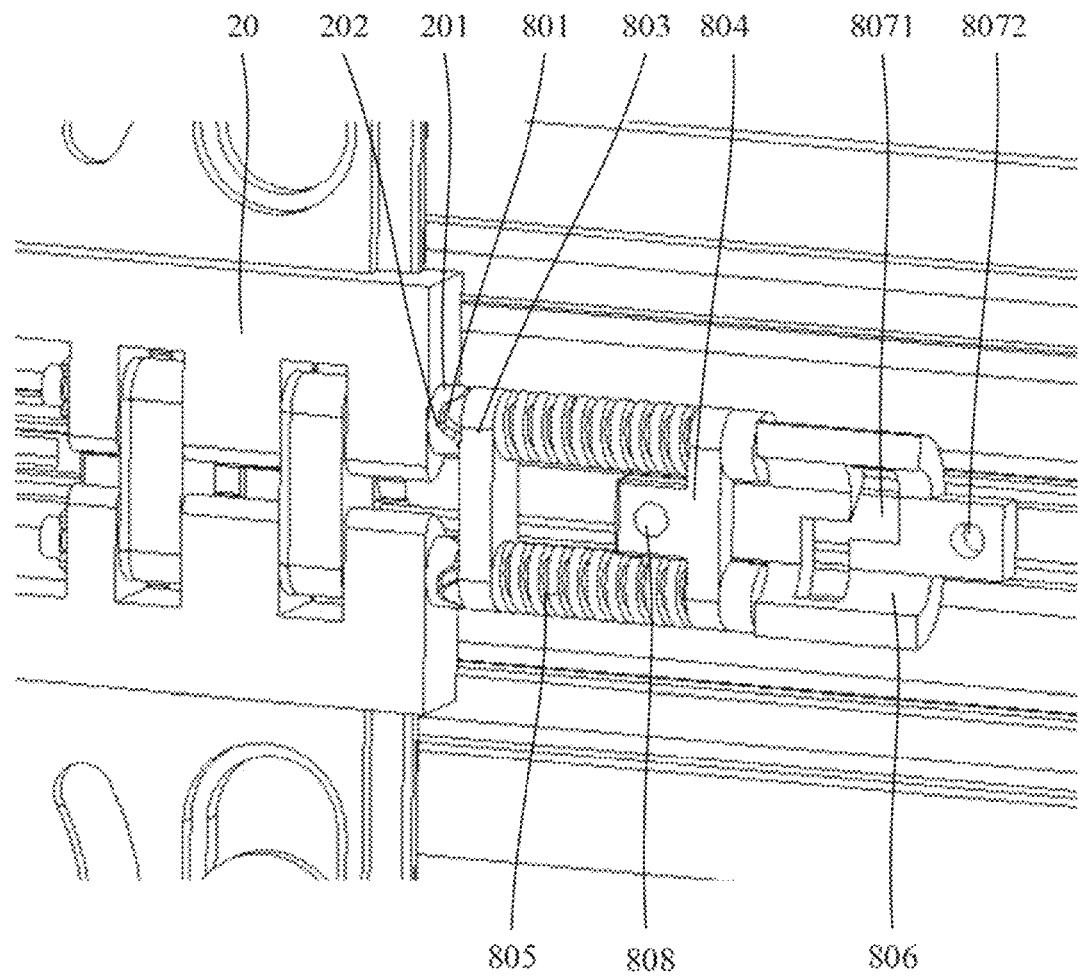
FIG. 19 is a locally schematic diagram of a support structure according to some embodiments of the present disclosure.

FIG. 19 is a locally schematic diagram of a support structure according to some embodiments of the present disclosure. Referring to FIG. 19, the support structure is in a complete open status. In bending the support structure, the rotation plate 20 rotates, and the second limit protrusion 201 on the rotation plate 20 rotates along with the rotation plate 20. Thus, the second limit protrusion 201 needs to overcome the resistance between the second limit protrusion 201 and the first limit protrusion 801 to be abutted against the first limit protrusion 801. Or, relative positions of the second limit protrusion 201 and the first limit recess 802 are changed, and the second limit protrusion 201 is disposed in another first limit recess 802. Thus, the support structure keeps in a specific status.

Figure 20:
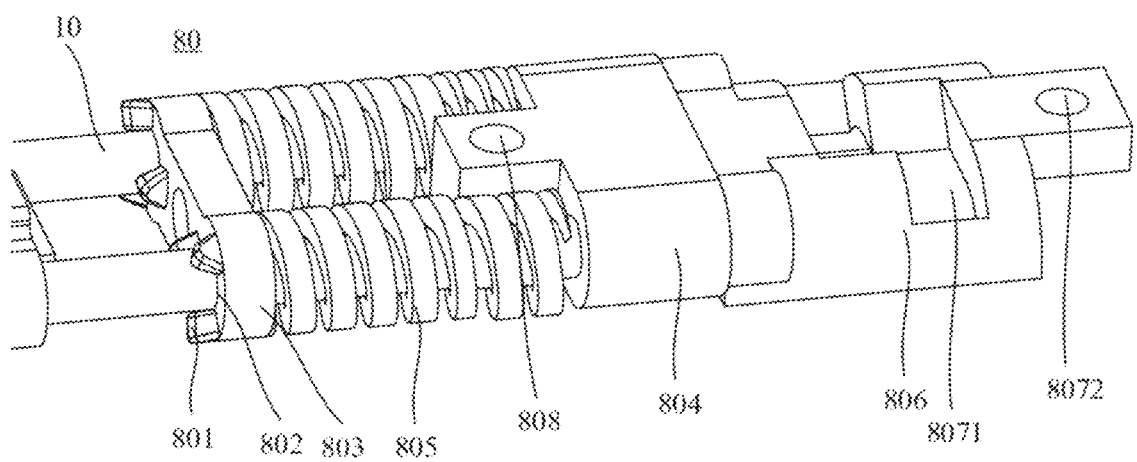
FIG. 20 is a schematic structural diagram of a limit assembly according to some embodiments of the present disclosure.

FIG. 20 is a schematic structural diagram of a limit assembly according to some embodiments of the present disclosure. Referring to FIG. 20, the end portion of the rotation shaft 10 is connected to the mounting block 806 after the rotation shaft 10 sequentially passes through the first stopper 803, the elastic member 805, and the second stopper 804.

It is noted that, in the embodiments of the present disclosure, the rotation shaft 10 is composed of a plurality of rotation sub-shafts, and the plurality of rotation sub-shafts are disconnected to each other. For example, in FIG. 16, one rotation sub-shaft passes through the chain 40 on the left side, and another rotation sub-shaft passes through the chain 40 on the right side and is connected to the limit assembly 80.

In the embodiments of the present disclosure, the first stopper 803 is configured to dispose the first limit protrusion 801, and the elastic member 805 provides the elastic force to the first limit protrusion 801, such that the first limit protrusion 801 squeezes the rotation plate 20. As such, the rotation plate 20 rotates on the premise of overcoming the elastic force, such that the support structure keeps in a specific status. The mounting block 806 is configured to fix the second stopper 804, such that the position of the second stopper 804 is not changed. As such, the elastic member 805 is compressed, such that the elastic force is generated on the first limit protrusion 801.

In the embodiments of the present disclosure, the first stopper 803 includes two turns of first limit protrusions 801, and the two turns of first limit protrusions 801 respectively correspond to the second limit protrusions 201 on two rotation plates 20. That is, one turn of first limit protrusion 801 corresponds to the second limit protrusion 201 on one rotation plate 20.

In the embodiments of the present disclosure, the support structure achieves the fixation of the rotation plate 20 in rotating by damping of the elastic member 805 in the limit assembly 80, that is, the support structure achieves self-locking by the limit assembly 80.

In some embodiments, the elastic member 805 is a spring, a rubber boot, and the like.

In the embodiments of the present disclosure, a number of the elastic members 805 between the first stopper 803 and the second stopper 804 is one, two, three, or more.

Referring to FIG. 20, the limit assembly 80 further includes a mounting through hole 808, and the mounting through bole 808 is configured to connect to other portions.

In the embodiments of the present disclosure, the mounting block 806 and the second stopper 804 are integrally formed, or are connected in other ways.

Referring to FIG. 3, the support structure further includes: a wrap assembly 90. The wrap assembly 90 extends in the first direction a.

Figure 21:
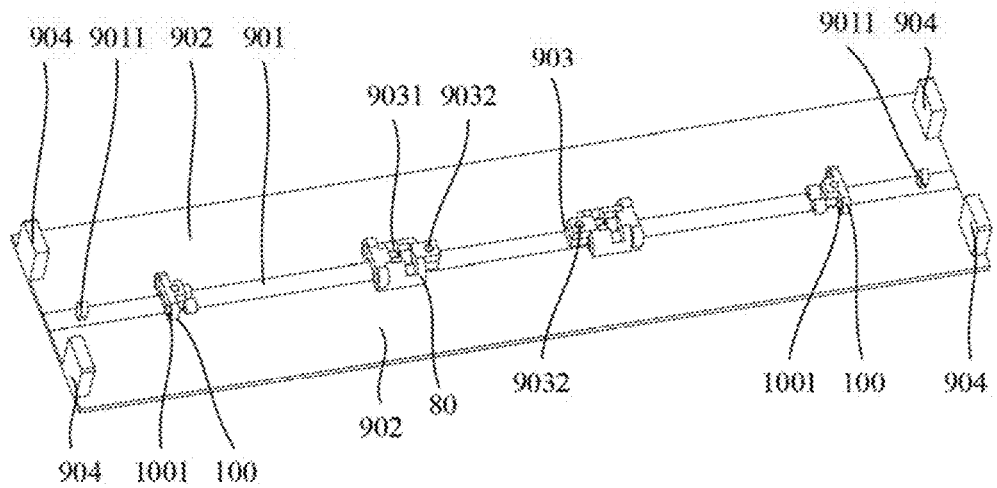
FIG. 21 is a schematic diagram of assembling a wrap assembly and a rotation shaft connection block.

FIG. 21 is a schematic diagram of assembling a wrap assembly and a rotation shaft connection block. Referring to FIG. 21, the support structure further includes a rotation shaft connection block 100. The rotation shaft connection block 100 is fixedly connected to a middle portion of the wrap assembly 90 and includes a first rotation shaft through hole 1001 for the rotation shaft 10 passing through. In the third direction c, the limit assembly 80 is disposed between the first support assembly 50 and the wrap assembly 90, and the wrap assembly 90 is connected to the limit assembly 80.

In the embodiments of the present disclosure, the wrap assembly 90 wraps two ends of the support structures to ensure the aesthetic of the bendable display device. The rotation shaft connection block 100 is disposed, the rotation shaft connection block 100 is connected to the wrap assembly 90, and the rotation shaft 10 passes through the first rotation shaft through hole 1001 in the rotation shaft connection block 100, such that the rotation shaft 10 is connected to the wrap assembly 90, and the stability of the wrap assembly 90 is ensured.

Referring to FIG. 21, the wrap assembly 90 includes a middle wrap plate 901, two rotation wrap plates 902, and a fixing protrusion 903. The middle wrap plate 901 extends in the first direction a, and the rotation shaft connection block 100 is connected to a surface of the middle wrap plate 201. The two rotation wrap plates 902 extend in the first direction a. In the second direction b, the two rotation wrap plates 902 are respectively disposed on two sides of the middle wrap plate 901, and the two rotation wrap plates 902 are rotatably connected to the middle wrap plate 901 respectively. The fixing protrusion 903 is connected to the surface of the middle wrap plate 901. The rotation shaft connection block 100 and the fixing protrusion 903 are connected to the same surface of the middle wrap plate 901, and the fixing protrusion 903 includes a first fixing boss 9031. Referring to FIG. 16, the mounting block 806 includes a fixing recess 807, and the first fixing boss 9031 is disposed in the fixing recess 807.

In the embodiments of the present disclosure, the middle wrap plate 901 is configured to connect to the rotation shaft connection block 100 and shield a part of the rotation shaft 10. The two rotation wrap plates 902 are disposed on two sides of the middle wrap plate 901 and shield parts, on two sides, of the rotation shaft 10. The two rotation wrap plates 902 are rotatably connected to the middle wrap plate 901, and the two rotation wrap plates 902 rotates in rotating the rotation plate 20, so as to avoid bending of the support structure.

The fixing protrusion 903 is connected to the surface of the middle wrap plate 901, and the fixing protrusion 903 is disposed in the fixing recess 807 in the mounting block 806. As such, in the case that the support structure and the flexible display panel are disposed, the fixing recess 807 limits the movements of the fixing protrusion 903, that is, the movements of the middle wrap plate 901, such that the wrap assembly 90 is disposed together with the limit assembly 80. As such, the wrap assembly 90 is disposed together with the limit assembly 80, and the fixing protrusion 903 is directly fetched from the fixing recess 807 in detaching to separate the wrap assembly 90 and the limit assembly 80, which is more convenient.

In some embodiments, the fixing recess 807 includes a first fixing sub-recess 8071 and a second fixing sub-recess 8072, and the fixing protrusion 903 includes the first fixed boss 9031 and a second fixing boss 9032. The first fixing boss 9031 is disposed in the first fixing sub-recess 8071, and the second fixing boss 9032 is disposed in the second fixing sub-recess 8072. The stability of the limit assembly 80 is ensured by matching the plurality of fixing protrusions and fixing recesses.

In some embodiments, the wrap assembly 90 includes the fixing recess, and the limit assembly 80 includes the fixing protrusion, which are not limited in the present disclosure.

Referring to FIG. 21, the wrap assembly 90 further includes four shield blocks 904. Two of the four shield blocks 904 are arranged in the first direction a, and are respectively connected to two side faces of one of the two rotation wrap plates 902. The other two of the four shield blocks 904 are arranged in the first direction a, and are respectively connected to two ends of the other of the two rotation wrap plates 902. In the first direction a, the first support assembly 50 is disposed between the two of the four shield blocks 904, and is disposed between the other two of the four shield blocks 904.

In the embodiments of the present disclosure, the four shield blocks 904 shield two sides of the support structure, such that the aesthetic of the display device is ensured after the support structure and the flexible display panel are disposed.

In some embodiments, the shield block 904 and the rotation wrap plate 902 are fixed together by wielding.

Referring to FIG. 1 and FIG. 2, the wrap assembly 90 includes two rotation shaft wrap members 905. The two rotation shaft wrap members 905 are arranged in the first direction a, one of the two rotation shaft wrap members 905 is disposed between the two of the four shield blocks 904, and the other of the two rotation shaft wrap members 905 is disposed between the other two of the four shield blocks 904. The two rotation shaft wrap members 905 shield the end portion of the rotation shaft 10 to avoid affecting the aesthetic.

Figure 22:
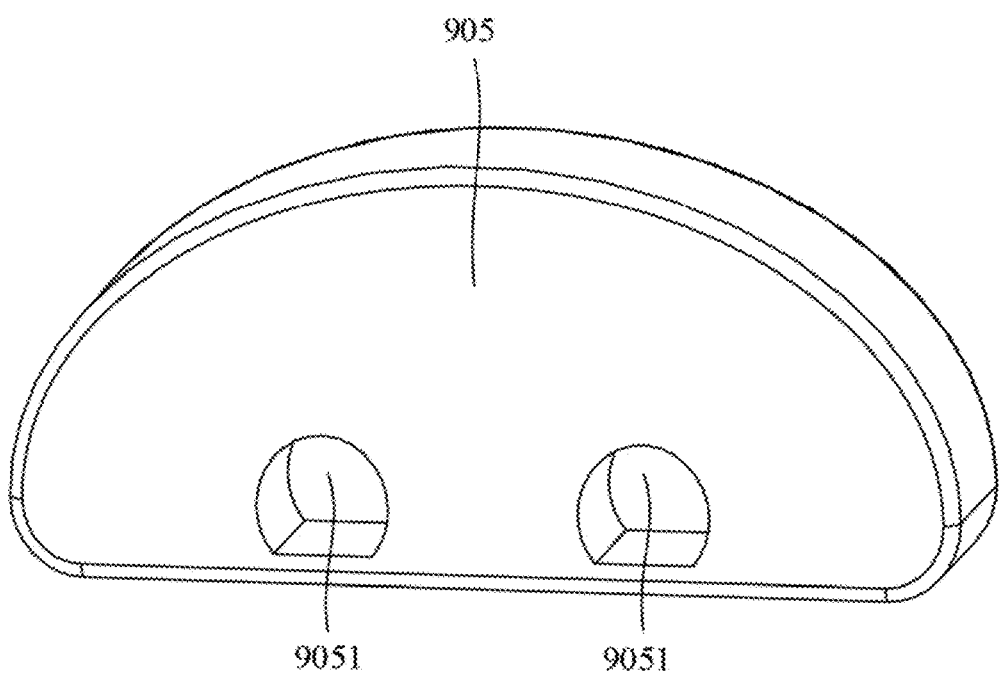
FIG. 22 is a schematic structural diagram of a rotation shaft wrap member according to some embodiments of the present disclosure.

FIG. 22 is a schematic structural diagram of a rotation shaft wrap member according to some embodiments of the present disclosure. Referring to FIG. 22, a middle portion of the rotation shaft wrap member 905 includes two rotation shaft mounting recesses 9051.

Figure 23:
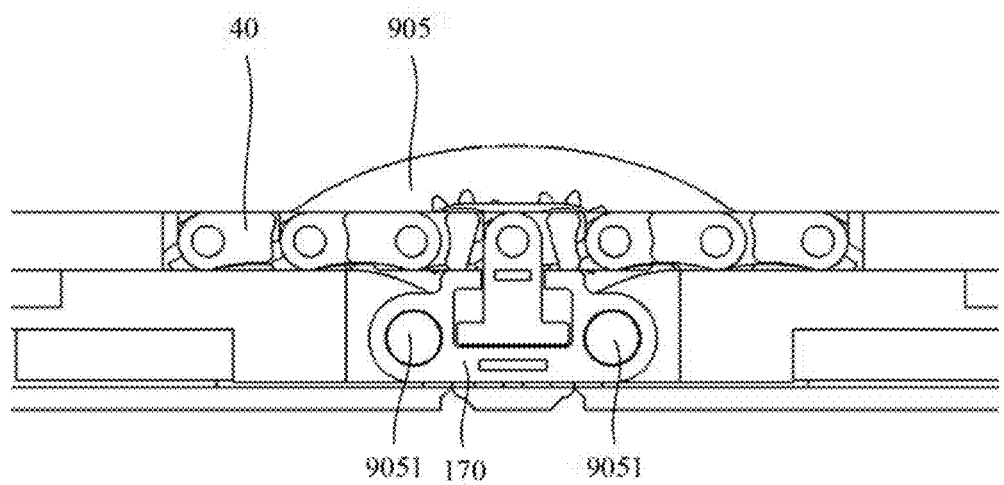
FIG. 23 is a schematic structural diagram of assembling a rotation shaft wrap member and a rotation shaft in a not bent status according to some embodiments of the present disclosure.

FIG. 23 is a schematic structural diagram of assembling a rotation shaft wrap member and a rotation shaft in a not bent status according to some embodiments of the present disclosure. Referring to FIG. 23, the end portion of the rotation shaft is disposed in the rotation shaft mounting recess 9051, and the rotation shaft mounting recesses 9051 and the rotation shaft 10 are in interference fit, such that the robustness of the connection of the rotation shaft wrap member 905 and the rotation shaft 10 is ensured.

Figure 24:
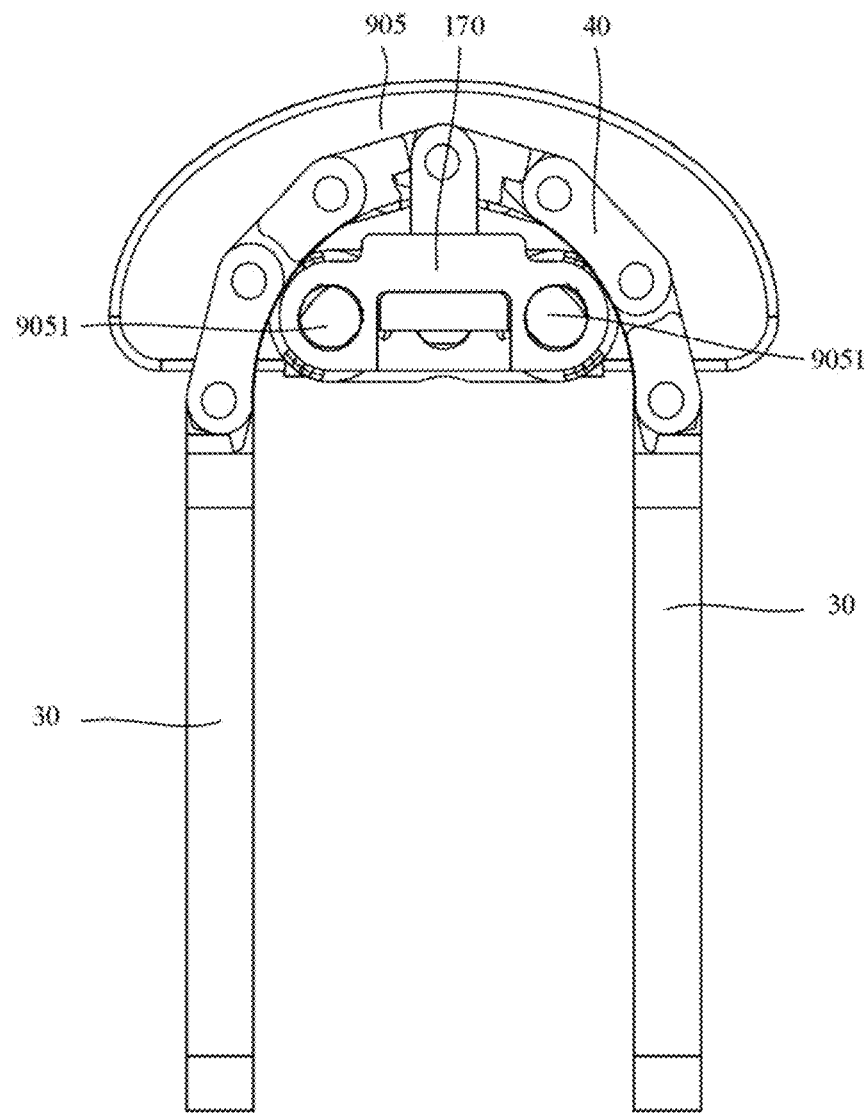
FIG. 24 is a schematic structural diagram of assembling a rotation shaft wrap member and a rotation shaft in a bent status according to some embodiments of the present disclosure.

FIG. 24 is a schematic structural diagram of assembling a rotation shaft wrap member and a rotation shaft in a bent status according to some embodiments of the present disclosure. Referring to FIG. 24, an outer surface of the rotation shaft wrap member 905 is in an arc-shaped. In the case that the support structure is bent along with the flexible display panel, the outer surface of the rotation shaft wrap member 905 and the flexible display panel transition smoothly, such that the display device is aesthetic.

In the embodiments of the present disclosure, the support structure includes two rotation shafts 10, and thus, the rotation shaft wrap member 905 includes two rotation shaft mounting recesses 9051. In some embodiments, the support structure includes one rotation shaft 10, and thus, the rotation shaft wrap member 905 includes one rotation shaft mounting recess 9051.

In the embodiments of the present disclosure, the two rotation shafts 10 are connected by a gear assembly for the synchronous-transfer of the two rotation shafts 10.

Figure 25:
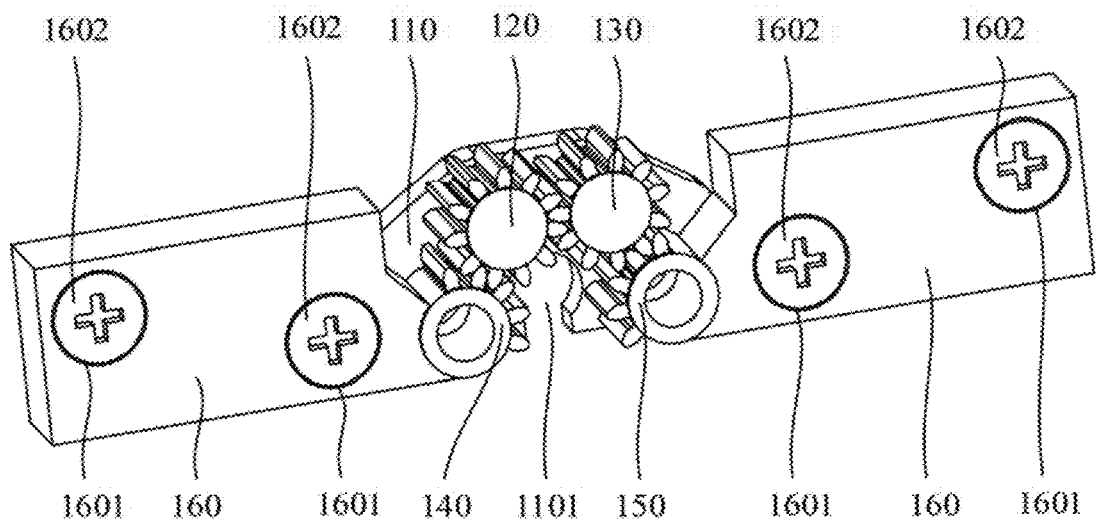
FIG. 25 is a schematic structural diagram of a gear assembly according to some embodiments of the present disclosure.

FIG. 25 is a schematic structural diagram of a gear assembly according to some embodiments of the present disclosure. Referring to FIG. 25, the support structure further includes: a gear plate 110, a first transmission gear 120, a second transmission gear 130, a first synchronous gear 140, and a second synchronous gear 150. A mounting face of the gear plate 110 is parallel to the third direction c, the gear plate 110 is detachably connected to the middle wrap plate 901. In the first direction a, the gear plate 110 is disposed on end portions, on a same side, of the two rotation shafts. The first transmission gear 120 is connected to the mounting face of the gear plate 110, and a rotation center of the first transmission gear 120 is parallel to the first direction a. The second transmission gear 130 is connected to the mounting face of the gear plate 110, and the second transmission gear 130 is engaged with the first transmission gear 120. The first synchronous gear 140 is engaged with the first transmission gear 120, and the first synchronous gear 140 is sleeved onto one of the two rotation shafts 10. The second synchronous gear 150 is engaged with the second transmission gear 120, and the second synchronous gear 150 is sleeved onto the other of the two rotation shafts 10.

The mounting face of the gear plate 110 is a face, facing away from the chain 40 (not shown in FIG. 25, and referred to the position relationship in FIG. 32), of the gear plate 110.

In the embodiments of the present disclosure, the support structure includes two rotation shafts 10, and the synchronous-transfer of the two rotation shafts 10 is achieved by the first transmission gear 120, the second transmission gear 130, the first synchronous gear 140, and the second synchronous gear 140. The first synchronous gear 140 is sleeved onto one of the two rotation shafts 10, the rotation shaft 10 rotates to drive the rotation of the first synchronous gear 140, the first synchronous gear 140 drives the rotation of the first transmission gear 120, the first transmission gear 120 drives the rotation of the second transmission gear 130, the second transmission gear 130 drives the rotation of the second synchronous gear 150, and the second synchronous gear 150 is sleeved onto the other of the two rotation shafts 10, such that the other of the two rotation shafts 10 rotates, and the synchronous-transfer of the two rotation shafts 10 is achieved.

Referring to FIG. 25, the support structure further includes two mounting plates 160. The two mounting plates 160 and the gear plate 110 are arranged side by side. One of the two mounting plates 160 is fixedly connected to an outer wall of the first synchronous gear 140, and is connected to one of the at least two rotation plates 20. The other of the two mounting plates 160 is fixedly connected to an outer wall of the second synchronous gear 150, and is connected to the other of the at least two rotation plates 20. Two rotation plates 20 connected to the at least two mounting plates are disposed on an end portion, on a same side, of the rotation shaft 10.

In the embodiments of the present disclosure, the two mounting plates 160 are respectively configured to dispose the first synchronous gear 140 and the second synchronous gear 150, and the two mounting plates 160 are driven to rotate in the rotation of the first synchronous gear 140 and the second synchronous gear 150. The two mounting plates 160 are respectively connected to the two rotation plates 20, and the two rotation plates 20 are further driven to rotate, such that the bending and flatting of the support structure are achieved.

Referring to FIG. 25, the mounting plate 160 includes two mounting holes 1601, and the mounting plate 160 is connected to the rotation plate 20, for example, by a second screw 1602.

Referring to FIG. 21, the middle wrap plate 901 includes a third limit protrusion 9011. Referring to FIG. 25, a middle portion of the gear plate 110 includes a third limit recess 1101.

Figure 26:
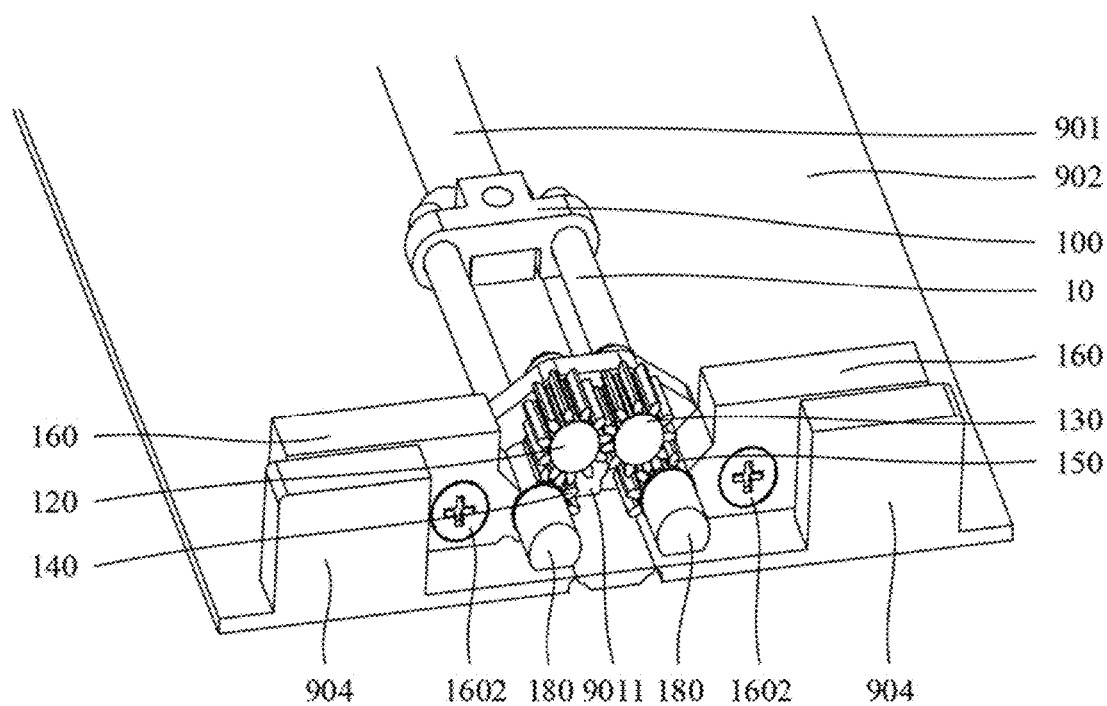
FIG. 26 is a locally schematic structural diagram of a support structure according to some embodiments of the present disclosure.

FIG. 26 is a locally schematic structural diagram of a support structure according to some embodiments of the present disclosure. Referring to FIG. 26, the third limit protrusion 9011 is disposed in the third limit recess 1101.

In the embodiments of the present disclosure, a length of the middle wrap plate 901 is greater, and thus, two ends of the middle wrap plate 901 are prone to cocking. As the third limit protrusion 9011 is disposed in the middle wrap plate 901, and the third limit protrusion 9011 is disposed in the third limit recess 1101, in the case that the middle wrap plate 901 is prone to cocking, the third limit protrusion 9011 blocks on the bottom face of the third limit recess 1101 to prevent the middle wrap plate 901 from cocking.

Figure 27:
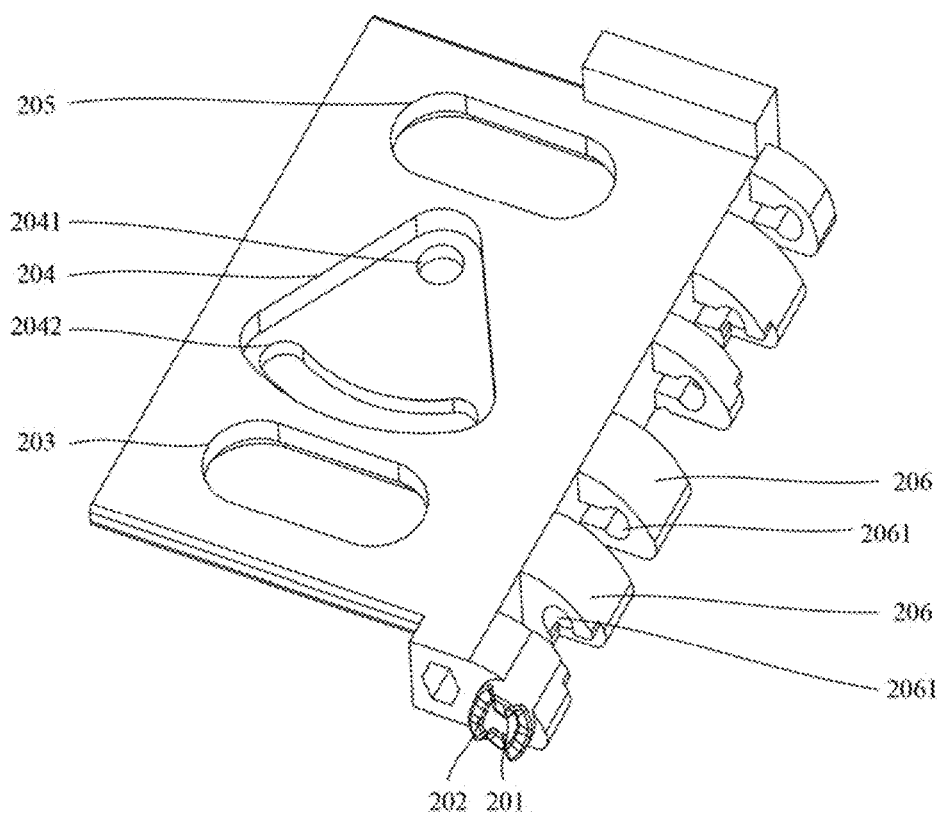
FIG. 27 is a schematic structural diagram of a rotation plate according to some embodiments of the present disclosure.

FIG. 27 is a schematic structural diagram of a rotation plate according to some embodiments of the present disclosure. Referring to FIG. 27, the rotation plate 20 includes a first waist-shaped hole 203, a sector-shaped recess 204, and a second waist-shaped hole 205 that are spaced apart in the first direction. Both a length direction of the first waist-shaped hole 203 and a length direction of the second waist-shaped hole 205 are the second direction b. A center point of the sector-shaped recess 204 is in a side, proximal to the second waist-shaped hole 205, of the sector-shaped recess 204, an arc face of the sector-shaped groove 204 is in a side, proximal to the first waist-shaped hole 203, of the sector-shaped recess 204, a side, proximal to the center point, of the sector-shaped recess 204 includes a circle-shaped hole 2041, and a side, proximal to the arc face, of the sector-shaped recess 204 includes a slide hole 2042 with the same extension direction as the arc face. A center point of the circle-shaped hole 2041, a center point of the sector-shaped recess 204, and a center of the arc face are in a same line. The line is a central symmetry axis of the first waist-shaped hole 203, and the line is also a central symmetry axis of the second waist-shaped hole 205.

Figure 28:
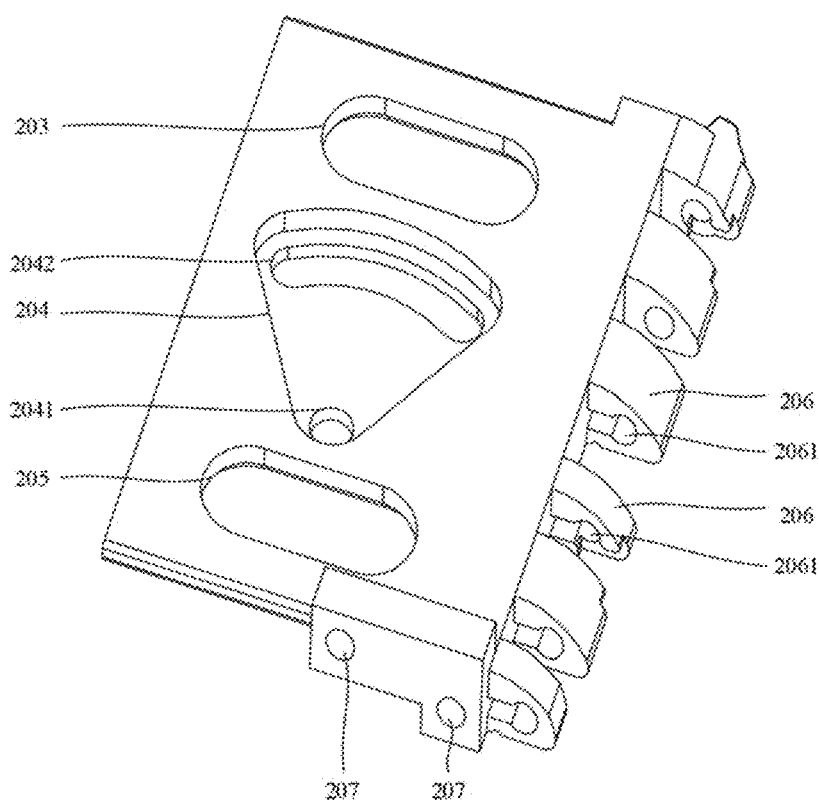
FIG. 28 is a schematic structural diagram of a rotation plate according to some embodiments of the present disclosure.

FIG. 27 shows a rotation plate on one side of the rotation shaft. FIG. 28 is a schematic structural diagram of a rotation plate according to some embodiments of the present disclosure, and shows a rotation plate on the other side of the rotation shaft.

Referring to FIG. 27 and FIG. 28, a side edge of the rotation plate 20 includes a plurality of rotation plate protrusions 206, and the plurality of rotation plate protrusions 206 include rotation plate through holes 2061 extending in the first direction a. The rotation plate through holes 2061 is used for the rotation shaft 10 passing through, such that the rotation plate 20 is connected to the rotation shaft 10.

Referring to FIG. 27 and FIG. 28, a side edge of the rotation plate 20 includes a gear fixing hole 207, the second screw 1602 passes through the gear fixing hole 207 to connect to the mounting hole 1601, such that the mounting plate 160 is connected to the rotation plate 20.

Referring to FIG. 16, the support structure further includes a plurality of slide blocks 190 and a rotation rod 210. A bottom face of any of the plurality of slide blocks 190 is disposed in a waist-shaped recess of one of the first waist-shaped hole 203 and the second waist-shaped hole 205, and each of the first waist-shaped hole 203 and each of the second waist-shaped hole 205 include one slide block 190. As the support structure includes four rotation plates 20, and each rotation plate 20 includes one first waist-shaped hole 203 and one second waist-shaped hole 205, the support structure includes eight slide blocks 190.

Figure 29:
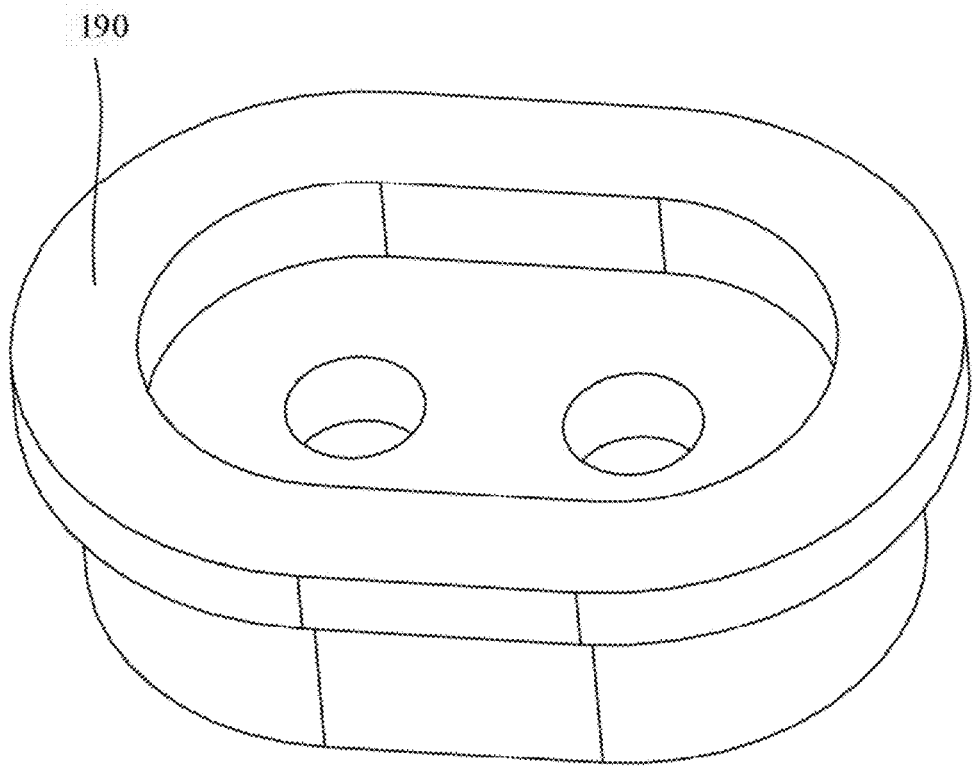
FIG. 29 is a schematic structural diagram of a slide block according to some embodiments of the present disclosure.

FIG. 29 is a schematic structural diagram of a slide block according to some embodiments of the present disclosure. Referring to FIG. 29, the slide block 190 is in waist-shaped, but a size of the slide block 190 is less than a size of the waist-shaped recess (301 and 302 in FIG. 31), such that the slide block 190 is capable of sliding in the waist-shaped recess.

Figure 30:
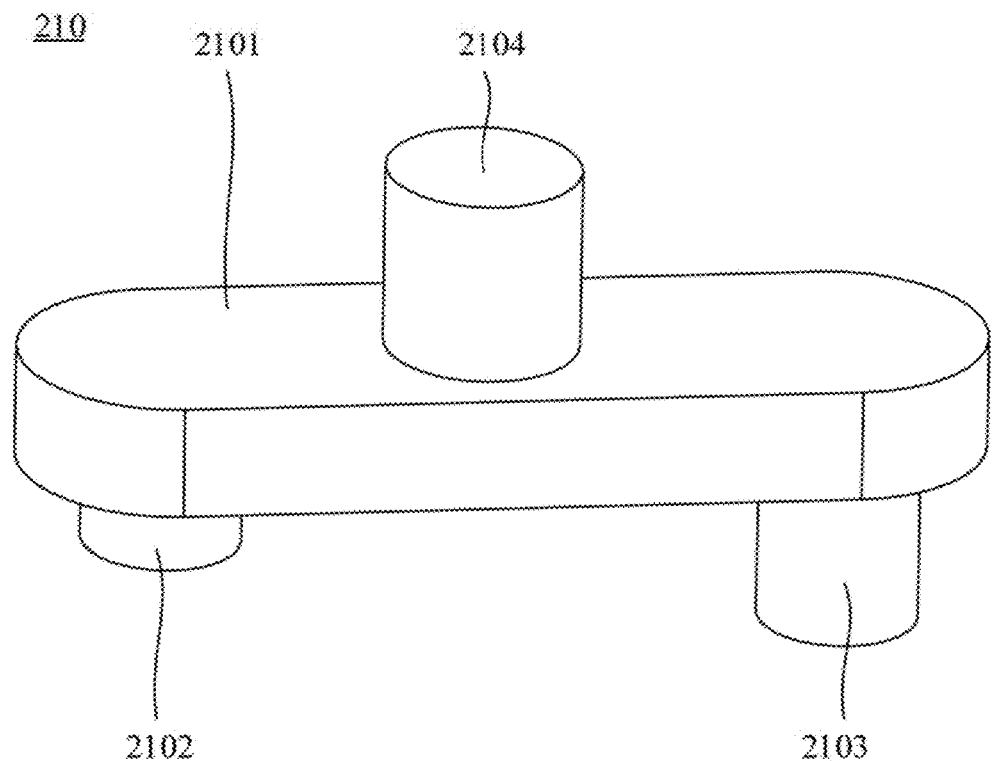
FIG. 30 is a schematic structural diagram of a rotation rod according to some embodiments of the present disclosure.

FIG. 30 is a schematic structural diagram of a rotation rod according to some embodiments of the present disclosure. Referring to FIG. 30, the rotation rod 210 includes a body rod 2101, a first protrusion 2102, a second protrusion 2103, and a third protrusion 2104. The first protrusion 2102 and the second protrusion 2103 are disposed on a same side of the body rod 2101, the first protrusion 2102 and the second protrusion 2103 are respectively disposed on two ends of the body rod 2101, and the third protrusion 2104 is disposed on the other side of the body rod 2101.

In conjunction with FIG. 16, FIG. 27, and FIG. 28, the first protrusion 2102 is disposed in the circle-shaped hole 2041, and the second protrusion 2103 is disposed in the slide hole 2042.

Figure 31:
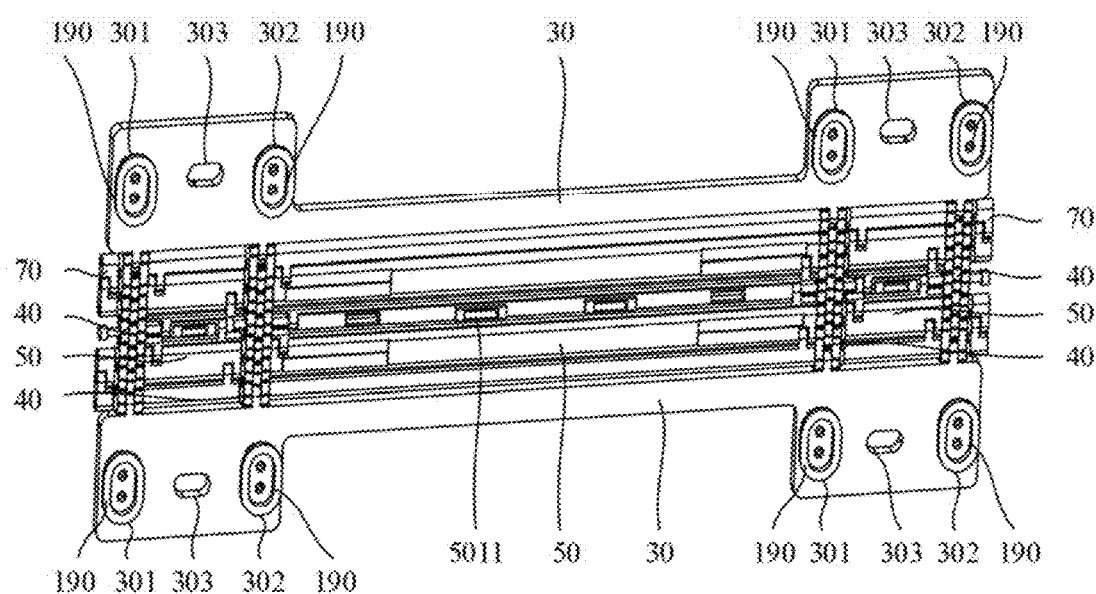
FIG. 31 is a schematic structural diagram of a support structure according to some embodiments of the present disclosure in another view.

FIG. 31 is a schematic structural diagram of a support structure according to some embodiments of the present disclosure in another view. Referring to FIG. 31, a face, opposite to the rotation plate 20, of the shift plate 30 includes first waist-shaped recesses 301 in one to one correspondence to the first waist-shaped holes 203, and second waist-shaped recesses 302 in one to one correspondence to the second waist-shaped holes 205. Sizes of the first waist-shaped recess 301 and the second waist-shaped recess 302 are slightly greater than the size of the slide block, but the sizes of the first waist-shaped recess 301 and the second waist-shaped recess 302 are less than sizes of the first waist-shaped hole 203 and the second waist-shaped hole 205. A surface of any of the plurality of slide blocks 190 is disposed in one of the first waist-shaped recess 301 and the second waist-shaped recess 302. The shift plate 30 further includes third waist-shaped holes 303 in one to one correspondence to the sector-shaped recesses 204. A length direction of the third waist-shaped hole 303 is coincident with the first direction a, and the third protrusion 2104 is disposed in the third waist-shaped hole 303. As such, the shift plate 30 is connected to the rotation plate 20 by the slide block 190 and the rotation rod 210, and in the rotation of the rotation plate 20, the slide block 190 rotates in the first waist-shaped hole 203 or the second waist-shaped hole 205 to drive the rotation of the shift plate 30.

Figure 32:
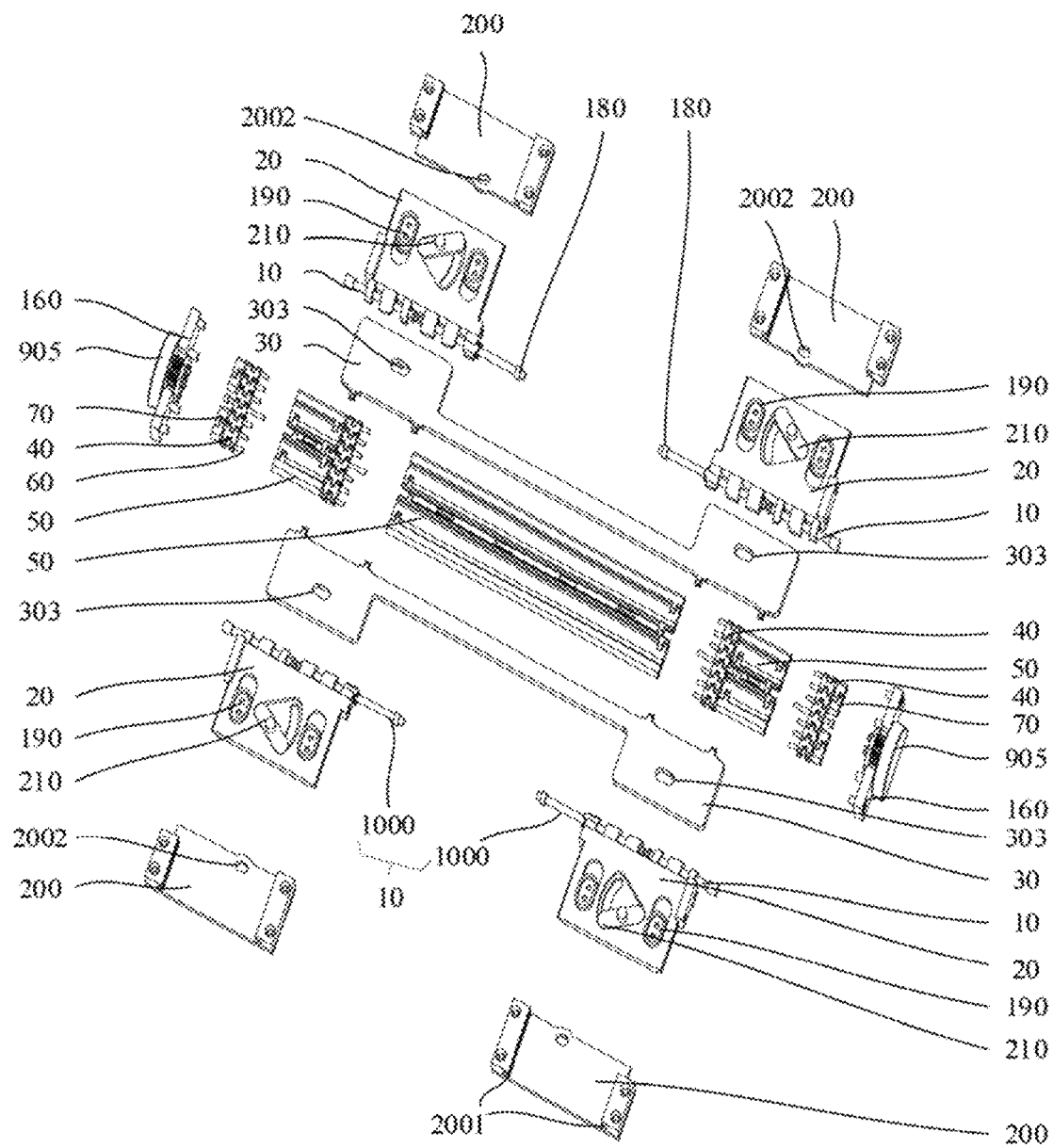
FIG. 32 is an exploded schematic structural diagram of a support structure according to some embodiments of the present disclosure.

FIG. 32 is an exploded schematic structural diagram of a support structure according to some embodiments of the present disclosure. Referring to FIG. 32, the support structure further includes a slide plate 200. The slide plate 200 is slidably connected to the shift plate 30, and is configured to improve the support property of the support structure.

As shown in FIG. 32, one rotation shaft 10 is composed of a plurality of rotation sub-shafts. FIG. 32 merely shows two rotation sub-shafts, and the two rotation sub-shafts 1000 are separated. FIG. 32 does not show middle limit assembly 80 and the rotation sub-shaft connected to the limit assembly 80.

Referring to FIG. 3, two sides of the slide plate 200 include slide ways 2001, and two slide ways 2001 are respectively slidably connected to the two sides of the shift plate 30.

In conjunction with FIG. 13, FIG. 16, and FIG. 30, a surface of the slide plate 200 includes a fourth waist-shaped hole 2002. The second protrusion 2103 passes through the slide hole 2042 and the fourth waist-shaped hole 2002, such that the slide plate 200 does not slide out of the shift plate 30.

Figure 33:
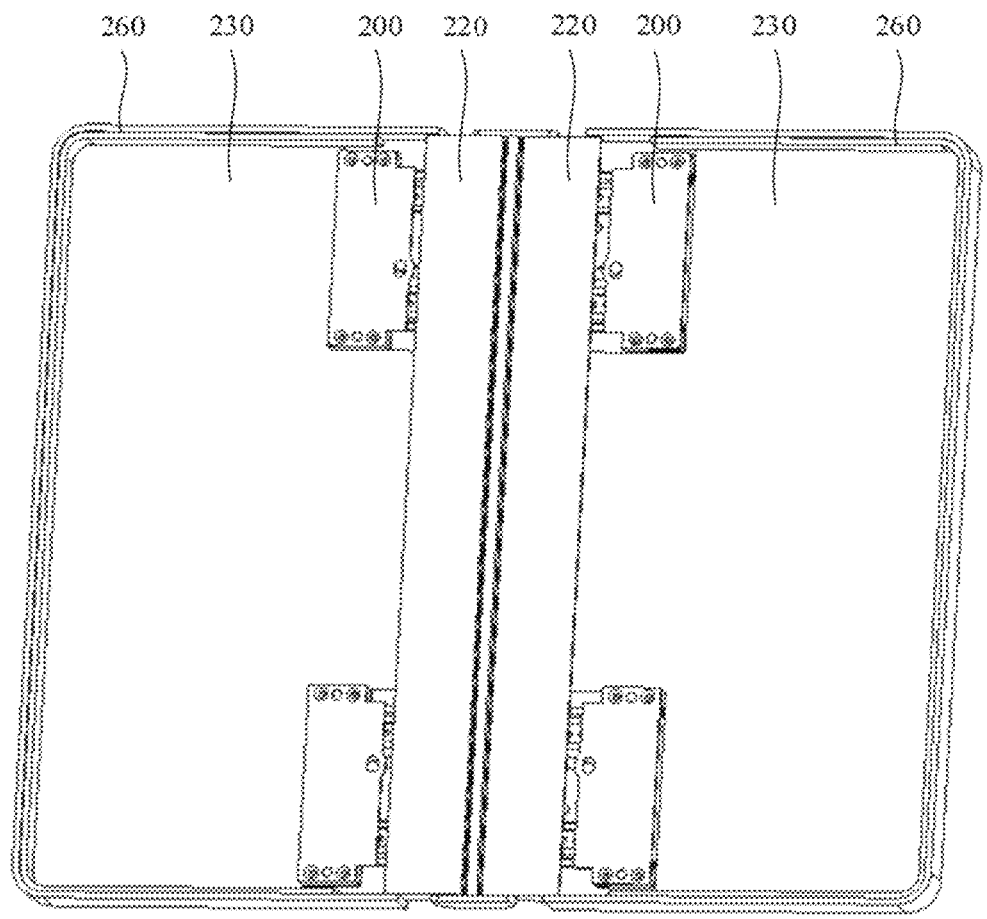
FIG. 33 is a schematic structural diagram of a support structure according to some embodiments of the present disclosure in another view.

FIG. 33 is a schematic structural diagram of a support structure according to some embodiments of the present disclosure in another view. Referring to FIG. 33, the support structure further includes two shield plates 220. The two shield plates 220 covers two sides of the shift plate 30 to shield the shift plate 30.

Referring to FIG. 33, the support structure further includes two support plates 230. The two support plates 230 are respectively connected to the two shift plates 30, and support the flexible display panel in other regions.

Figure 34:
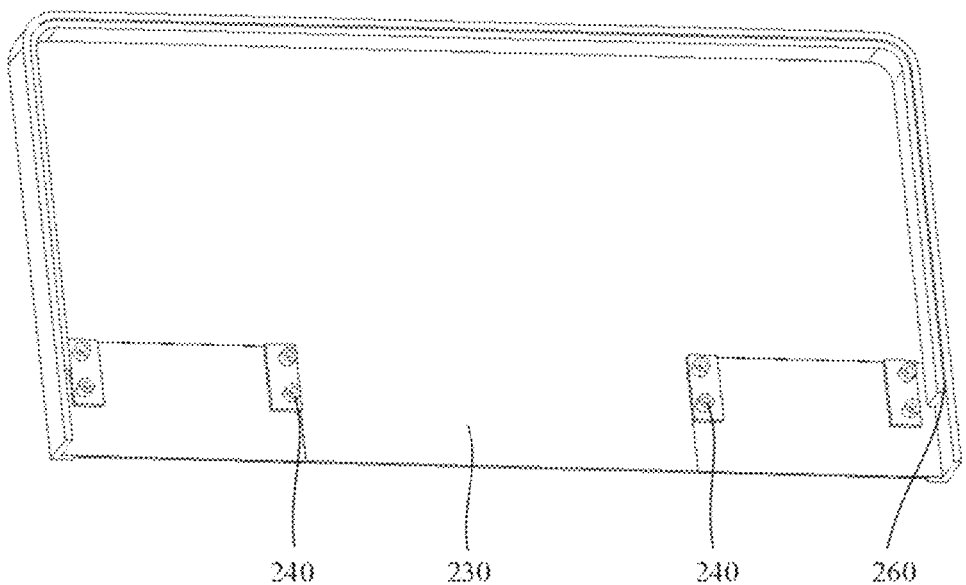
FIG. 34 is a schematic structural diagram of a support structure according to some embodiments of the present disclosure in another view.

FIG. 34 is a schematic structural diagram of a support structure according to some embodiments of the present disclosure in another view. Referring to FIG. 34, the support plate 230 is connected to the shift plate 30 by a stud 240.

Figure 35:
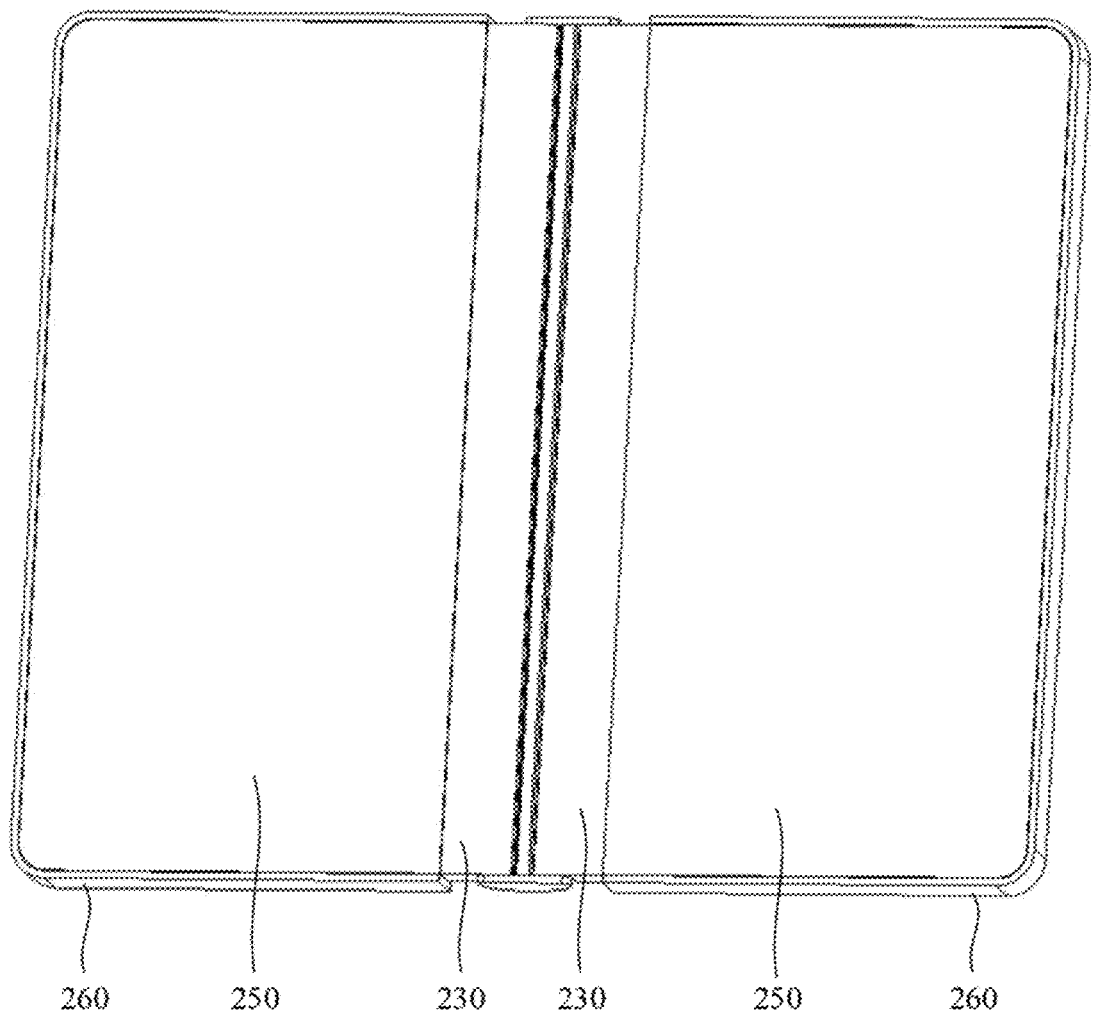
FIG. 35 is a schematic structural diagram of a support structure according to some embodiments of the present disclosure in another view.

FIG. 35 is a schematic structural diagram of a support structure according to some embodiments of the present disclosure in another view. Referring to FIG. 35, the support structure further includes a rear shell 250 configured to shield the support plate 230, the shift plate 30, and the stud 240.

Referring to FIG. 34 and FIG. 35, a periphery of the support structure includes a turn of fixing plate 260 configured to protect the periphery of the rear shell 250 and reduce the possibility of damaging the periphery of the rear shell 250.

The embodiments of the present disclosure further provide a display device. The display device includes a flexible display panel and above support structure. The flexible display panel includes a bendable display region, the support structure is disposed on a back face of the flexible display panel, and the rotation shaft is opposite to the bendable display region.

In the embodiments of the present disclosure, the display device is an organic light-emitting diode (OLED) display device, or a quantum dot light-emitting diodes (QLED) display device.

In some embodiments, the display device is an outward bend display device.

In actual application, the display device in the embodiments of the present disclosure is any product or components with display functions, such as a mobile phone, a tablet computer, a television, a monitor, a laptop computer, a digital photo frame, a navigator, and the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A support structure, configured to support a flexible display panel, the support structure comprising:
   a rotation shaft;
   two slidable connection mechanisms, wherein the two slidable connection mechanisms are rotatably connected to the rotation shaft, disposed on two sides of the rotation shaft, and configured to support an unbendable display region of the flexible display panel;
   at least two chains, wherein the at least two chains are spaced apart in an axial direction of the rotation shaft, extension directions of the at least two chains are perpendicular to the axial direction of the rotation shaft, middle portions of the at least two chains are connected to the rotation shaft, and two ends of each of the at least two chains are respectively connected to the two slidable connection mechanisms; and
   at least one first support assembly, wherein in the axial direction of the rotation shaft, each of the at least one first support assembly is connected between two adjacent chains of the at least two chains, and a surface, distal from the rotation shaft, of the at least one first support assembly and a surface, distal from the rotation shaft, of the chain are configured to support a bendable display region of the flexible display panel;
   wherein the at least one first support assembly comprises a plurality of first supports juxtaposed in the extension direction of the chain, wherein
      any two adjacent first supports of the plurality of first supports are rotatably connected, and a rotation centerline is parallel to the axial direction of the rotation shaft; and
      each of the plurality of first supports extends along the axial direction of the rotation shaft;
   wherein in the any two adjacent first supports of the plurality of first supports, an outer sidewall, facing towards the other first support, of one first support comprises a first recess, and the other first support comprises a first protrusion disposed in the first recess, wherein the first protrusion is rotatably connected to the first recess.

2. The support structure according to claim 1, further comprising:
   a first connection pin, wherein a middle portion of the first connection pin is fixedly connected to the chain, and one end of the first connection pin is fixedly connected to an end portion of the first support.

3. The support structure according to claim 1, further comprising:
   two second support assemblies, wherein in the axial direction of the rotation shaft, each of the at least two chains is disposed between the two second support assemblies, an end of one of the two second support assemblies is connected to a side face of one, proximal to one end of the rotation shaft, of the at least two chains, and an end of the other of the two second support assemblies is connected to a side face of one, proximal to the other end of the rotation shaft, of the at least two chains, wherein the side face of the chain is a face, facing towards an end portion of proximal rotation shaft, of the chain.

4. The support structure according to claim 3, wherein the second support assembly comprises two pairs of supports, wherein the two pairs of supports are spaced apart in the extension direction of the chain, each of the two pairs of supports comprises two second supports juxtaposed in the extension direction of the chain, and one end portion of each of the two second supports is connected to the side face of the chain; and
   outer sidewalls of the two second supports comprise second protrusions, wherein the outer sidewalls of the two second supports comprising the second protrusions are opposite to each other, and the second protrusions of the two second supports are rotatably connected.

5. The support structure according to claim 1, wherein the two slidable connection mechanisms comprise:
   at least two rotation plates respectively disposed on the two sides of the rotation shaft and rotatably connected to the rotation shaft; and
   at least one pair of shift plates, wherein each of the at least one pair of shift plates comprises two spaced-apart shift plates, and different pairs of shift plates are spaced apart in the axial direction of the rotation shaft;
   wherein any one of the at least two rotation plates is opposite to one shift plate, the shift plate is slidably connected to an opposite rotation plate, and a slide direction of the shift plate is perpendicular to the axial direction of the rotation shaft.

6. The support structure according to claim 5, further comprising: a limit assembly, wherein
   the limit assembly is disposed between two shift plates of one pair of shift plates, one end of the limit assembly is abutted against a side face of at least one of the at least two rotation plates, and a middle portion of the limit assembly is fixedly connected to the rotation shaft;
   an end face of the other end of the limit assembly comprises a plurality of first limit protrusions, wherein the plurality of first limit protrusions are circumferentially spaced apart, and a first limit recess is formed between two adjacent first limit protrusions; and
   a side face of the rotation plate abutted against the other end of the limit assembly comprises a plurality of second limit protrusions, wherein the plurality of second limit protrusions are circumferentially spaced apart, a second limit recess is formed between two adjacent second limit protrusions, and a centerline of the rotation shaft connected to the rotation plate and a centerline of a circumference of the plurality of second limit protrusions are collinear;
   wherein the first limit protrusion is disposed in the second limit recess, and the second limit protrusion is disposed in the first limit recess, or the first limit protrusion is abutted against the second limit protrusion.

7. The support structure according to claim 6, wherein the limit assembly comprises:
   a first stopper, wherein the first limit protrusion is disposed on one end face, facing towards the rotation plate, of the first stopper;
   a second stopper spaced apart from the first stopper in the axial direction of the rotation shaft;
   an elastic member, wherein one end of the elastic member is connected to the other end face of the first stopper, and the other end of the elastic member is connected to one end face of the second stopper; and a mounting block connected to the other end face of the second stopper and fixedly connected to the rotation shaft.

8. The support structure according to claim 7, further comprising:

a wrap assembly extending in the axial direction of the rotation shaft; and a rotation shaft connection block fixedly connected to a middle portion of the wrap assembly and comprising a first rotation shaft through hole for the rotation shaft passing through;

wherein in a third direction, the limit assembly is disposed between the at least one first support assembly and the wrap assembly, the third direction is perpendicular to the axial direction of the rotation shaft and the extension direction of the chain, and the wrap assembly is connected to the limit assembly.

9. The support structure according to claim 8, wherein the wrap assembly comprises:

a middle wrap plate extending in the axial direction of the rotation shaft, wherein the rotation shaft connection block is connected to a surface of the middle wrap plate;

two rotation wrap plates extending in the axial direction of the rotation shaft, wherein in the extension direction of the chain, the two rotation wrap plates are respectively disposed on two sides of the middle wrap plate, and the two rotation wrap plates are rotatably connected to the middle wrap plate respectively; and a fixing protrusion connected to the surface of the middle wrap plate, wherein the rotation shaft connection block and the fixing protrusion are connected to the same surface of the middle wrap plate, and the fixing protrusion comprises a first fixing boss;

wherein the mounting block comprises a fixing recess, and the first fixing boss is disposed in the fixing recess.

10. The support structure according to claim 9, the wrap assembly further comprises:

four shield blocks, wherein two of the four shield blocks are arranged in the axial direction of the rotation shaft and are respectively connected to two ends of one of the two rotation wrap plates, the other two of the four shield blocks are arranged in the axial direction of the rotation shaft and are respectively connected to two ends of the other of the two rotation wrap plates, and in the axial direction of the rotation shaft, the at least one first support assembly is disposed between the two of the four shield blocks and is disposed between the other two of the four shield blocks.

11. The support structure according to claim 9, comprising two rotation shafts;

a gear plate, wherein a mounting face of the gear plate is parallel to the third direction, the gear plate is detachably connected to the middle wrap plate, and in the axial direction of the rotation shaft, the gear plate is disposed on end portions, on a same side, of the two rotation shafts, wherein the mounting face of the gear plate is a face, facing away from the chain, of the gear plate;

a first transmission gear, wherein the first transmission gear is rotatably connected to the mounting face of the gear plate, and a rotation center of the first transmission gear is parallel to the axial direction of the rotation shaft;

a second transmission gear, wherein the second transmission gear is rotatably connected to the mounting face of the gear plate, and the second transmission gear is engaged with the first transmission gear;

a first synchronous gear, wherein the first synchronous gear is engaged with the first transmission gear, and the first synchronous gear is sleeved onto one of the two rotation shafts; and a second synchronous gear, wherein the second synchronous gear is engaged with the second transmission gear, and the second synchronous gear is sleeved onto the other of the two rotation shafts.

12. The support structure according to claim 11, further comprising:

at least two mounting plates, wherein one of the at least two mounting plates is fixedly connected to an outer wall of the first synchronous gear and is connected to one of the at least two rotation plates, the other of the at least two mounting plates is fixedly connected to an outer wall of the second synchronous gear and is connected to the other of the at least two rotation plates, and two rotation plates connected to the at least two mounting plates are disposed on an end portion, on a same side, of the rotation shaft.

13. The support structure according to claim 1, further comprising:

an elevator assembly, wherein one end of the elevator assembly is connected to the middle portion of the chain, the other end of the elevator assembly is connected to the rotation shaft, and the elevator assembly is configured to change a distance between the middle portion of the chain and the rotation shaft.

14. The support structure according to claim 13, wherein the elevator assembly comprises:

a first connection block, wherein the first connection block comprises a second rotation shaft through hole, a middle portion of the rotation shaft is disposed in the second rotation shaft through hole, and the first connection block comprises a protrusion through hole;

a second connection block, wherein the second connection block comprises a connection pin through hole, a part of the second connection block is disposed in the protrusion through hole, another part of the second connection block is disposed outside the protrusion through hole, the second connection block is slidably connected to the first connection block, and a slide direction of the second connection block is perpendicular to the axial direction of the rotation shaft and the extension direction of the chain;

a second connection pin, wherein one end of the second connection pin is connected to the middle portion of the chain, and the other end of the second connection pin is connected to the connection pin through hole; and an elastic plate, wherein one end of the elastic plate is connected to the first connection block, and the other end of the elastic plate is connected to the second connection block.

15. The support structure according to claim 5, wherein the chain comprises:

a first link, wherein one end of the first link is connected to one shift plate of the one pair of shift plates; and a plurality of second links, wherein the plurality of second links are sequentially rotatably connected, second links, on one end, of the plurality of second links are connected to the other end of the first link, and second links, on the other end, of the plurality of second links are connected to the other shift plate of the one pair of shift plates;

wherein both the first link and the second link comprise a first limit face and a second limit face, and the second link further comprises a third limit face and a fourth limit face, wherein the first limit face is attached to the third limit face in the case that the support structure is not bent, and the second limit face is attached to the fourth limit face in the case that the support structure is in a maximally bending status.

16. The support structure according to claim 5, comprising: four chains and three first support assemblies, wherein the four chains are spaced apart in the axial direction of the rotation shaft, the three first support assemblies are disposed between two adjacent chains of the four chains, and the three first support assemblies are disposed between different two adjacent chains.

17. The support structure according to claim 16, wherein the two slidable connection mechanisms comprise: four rotation plates and one pair of shift plates, wherein two of the four rotation plates are disposed on one side end portion of the rotation shaft, and are respectively disposed on the two sides of the rotation shaft; the other two of the four rotation plates are disposed on the other side end portion of the rotation shaft, and are respectively disposed on the two sides of the rotation shaft; and one shift plate of the one pair of shift plates is connected to one end of each of the four chains, and the other shift plate of the one pair of shift plates is connected to the other end of each of the four chains.

18. A display device, comprising: a flexible display panel and a support structure, wherein the support structure comprises:

a rotation shaft;

two slidable connection mechanisms, wherein the two slidable connection mechanisms are rotatably connected to the rotation shaft, disposed on two sides of the rotation shaft, and configured to support an unbendable display region of the flexible display panel;

at least two chains, wherein the at least two chains are spaced apart in an axial direction of the rotation shaft, extension directions of the at least two chains are perpendicular to the axial direction of the rotation shaft, middle portions of the at least two chains are connected to the rotation shaft, and two ends of each of the at least two chains are respectively connected to the two slidable connection mechanisms; and at least one first support assembly, wherein in the axial direction of the rotation shaft, each of the at least one first support assembly is connected between two adjacent chains of the at least two chains, and a surface, distal from the rotation shaft, of the at least one first support assembly and a surface, distal from the rotation shaft, of the chain are configured to support a bendable display region of the flexible display panel;

wherein the at least one first support assembly comprises a plurality of first supports juxtaposed in the extension direction of the chain, wherein any two adjacent first supports of the plurality of first supports are rotatably connected, and a rotation centerline is parallel to the axial direction of the rotation shaft; and each of the plurality of first supports extends along the axial direction of the rotation shaft;

wherein in the any two adjacent first supports of the plurality of first supports, an outer sidewall, facing towards the other first support, of one first support comprises a first recess, and the other first support comprises a first protrusion disposed in the first recess, wherein the first protrusion is rotatably connected to the first recess;

and the flexible display panel comprises the bendable display region, the support structure is disposed on a back face of the flexible display panel, and the rotation shaft is opposite to the bendable display region.

\* \* \* \* \*